United States Patent
Wu et al.

(10) Patent No.: US 12,526,763 B2
(45) Date of Patent: Jan. 13, 2026

(54) POSITIONING FUSION BASED ON INFORMATION FROM SIDELINK DEVICE

(71) Applicant: QUALCOMM Incorporated, San Diego, CA (US)

(72) Inventors: Shuanshuan Wu, San Diego, CA (US); Shailesh Patil, San Diego, CA (US); Gene Wesley Marsh, San Diego, CA (US); Arthur Gubeskys, San Diego, CA (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 18/059,294

(22) Filed: Nov. 28, 2022

(65) Prior Publication Data

US 2024/0179664 A1    May 30, 2024

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
CPC ......... H04W 4/40; H04W 4/44; H04W 64/00; H04W 92/18
See application file for complete search history.

(56) References Cited

U.S. PATENT DOCUMENTS

| | | |
|---|---|---|
| 11,330,549 B2 | 5/2022 | Zhang et al. |
| 2020/0389759 A1 | 12/2020 | Wang et al. |
| 2022/0039080 A1 | 2/2022 | Khoryaev et al. |

OTHER PUBLICATIONS

3GPP TR 23.700-86: "3rd Generation Partnership Project, Technical Specification Group Services and System Aspects, Study on Architecture Enhancement to Support Ranging based Services and Sidelink Positioning (Release 18)", 3GPP Standard, Technical Report, 3rd Generation Partnership Project, Mobile Competence Centre, 650, Route Des Luciloes, F-06921 Sophia-Antipolis Cedex, France, No. V1.1.0, Oct. 25, 2022, pp. 1-167, XP052211668, pp. 117-118, Paragraph 6.29.2, pp. 127-130, Paragraph 6.32.1.
International Search Report and Written Opinion—PCT/US2023/075517—ISA/EPO—Feb. 2, 2024.
Qualcomm Incorporated: "Study of Sidelink Positioning Architecture, Signaling and Procedures", 3GPP TSG RAN WG2 Meeting #119bis-e, R2-2210363, 3rd Generation Partnership Project (3GPP), Mobile Competence Centre, 650, Route Des Luciloes, F-06921, Sophia-Antipolis Cedex, France, vol. RAN WG2, No. E-meeting, Oct. 10, 2022-Oct. 19, 2022, Sep. 30, 2022, pp. 1-28, XP052263685, p. 7, Paragraph 2.3-p. 9, Paragraph 2.5.

*Primary Examiner* — Sam Bhattacharya
(74) *Attorney, Agent, or Firm* — Thien T. Nguyen

(57) ABSTRACT

Disclosed are techniques for wireless communication. In an aspect, a wireless device may receive one or more parameters from a roadside unit (RSU) via sidelink communication between the wireless device and the RSU, the one or more parameters indicating one or more characteristics regarding a sidelink positioning operation with the RSU or regarding a surrounding environment of the RSU. The wireless device may determine a whether or how to use a result of the sidelink positioning operation with the RSU with a result of a positioning estimation procedure of the wireless device based on the one or more parameters.

30 Claims, 12 Drawing Sheets

POSITIONING FUSION BASED ON INFORMATION FROM SIDELINK DEVICE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless device includes receiving one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determining whether or how to use a result of the sidelink positioning operation with the RSU with a result of a positioning estimation procedure of the wireless device based on the one or more parameters.

In an aspect, a method of operating a roadside unit (RSU) includes obtaining one or more parameters indicating one or more characteristics regarding a sidelink positioning operation with the RSU or regarding a surrounding environment of the RSU; and transmitting the one or more parameters to a wireless device via sidelink communication between the RSU and the wireless device.

In an aspect, a wireless device includes a memory; at least one transceiver; and at least one processor communicatively coupled to the memory and the at least one transceiver, the at least one processor configured to: receive, via the at least one transceiver, one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determine whether or how to use a result of the sidelink positioning operation with the RSU with a result of a positioning estimation procedure of the wireless device based on the one or more parameters.

In an aspect, a roadside unit (RSU) includes a memory; at least one transceiver; and at least one processor communicatively coupled to the memory and the at least one transceiver, the at least one processor configured to: obtain one or more parameters indicating one or more characteristics regarding a sidelink positioning operation with the RSU or regarding a surrounding environment of the RSU; and transmit, via the at least one transceiver, the one or more parameters to a wireless device via sidelink communication between the RSU and the wireless device.

In an aspect, a wireless device includes means for receiving one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and means for determining whether or how to use a result of the sidelink positioning operation with the RSU with a result of a positioning estimation procedure of the wireless device based on the one or more parameters.

In an aspect, a roadside unit (RSU) includes means for obtaining one or more parameters indicating one or more characteristics regarding a sidelink positioning operation with the RSU or regarding a surrounding environment of the RSU; and means for transmitting the one or more parameters to a wireless device via sidelink communication between the RSU and the wireless device.

In an aspect, a non-transitory computer-readable medium stores computer-executable instructions that, when executed by a wireless device, cause the wireless device to: receive one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determine whether or how to use a result of the sidelink positioning operation with the RSU with a result of a positioning estimation procedure of the wireless device based on the one or more parameters.

In an aspect, a non-transitory computer-readable medium stores computer-executable instructions that, when executed by a roadside unit (RSU), cause the RSU to: obtain one or more parameters indicating one or more characteristics regarding a sidelink positioning operation with the RSU or regarding a surrounding environment of the RSU; and transmit the one or more parameters to a wireless device via sidelink communication between the RSU and the wireless device.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
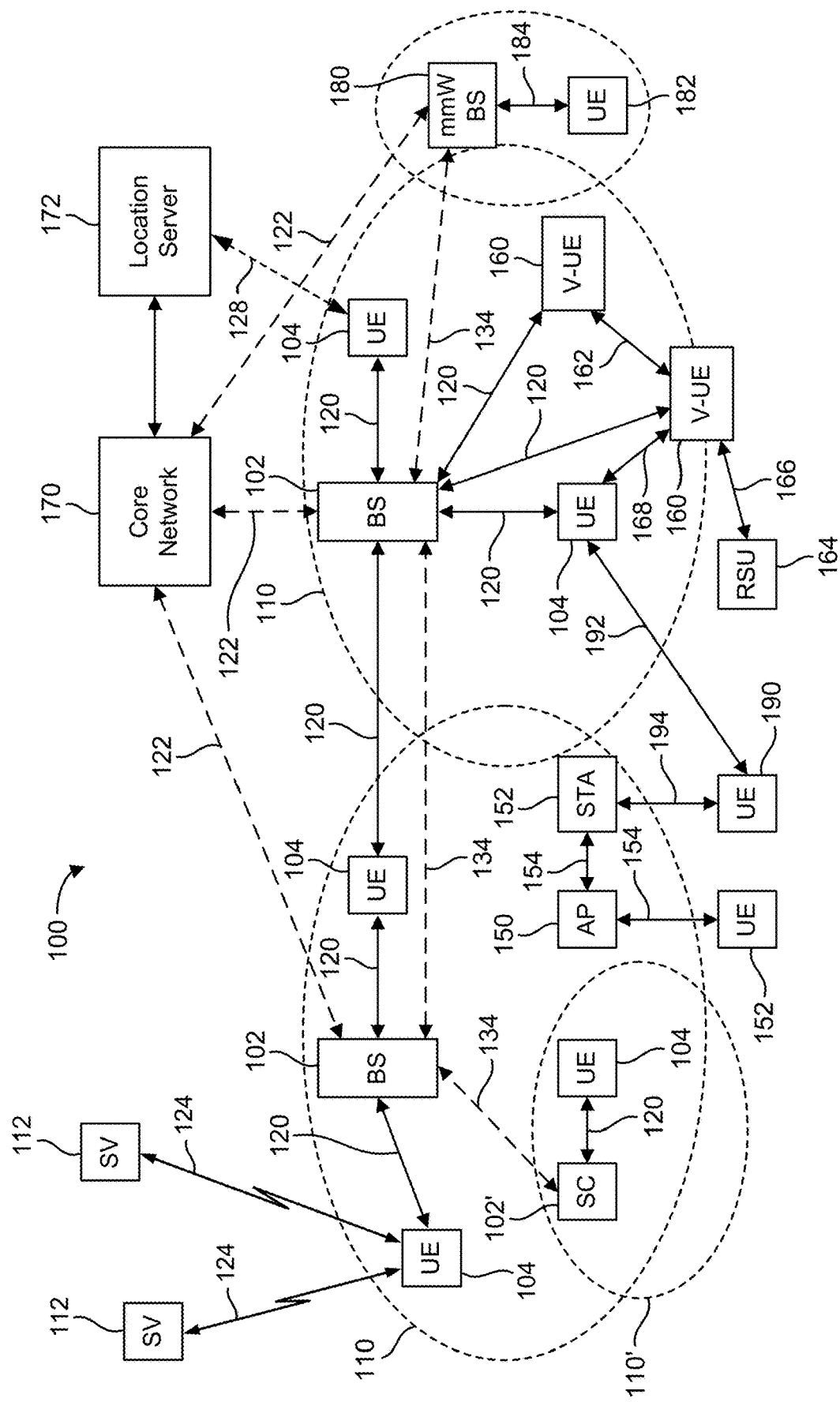
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system (or also referred to as a global navigation satellite system (GNSS)), the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. In some aspects, the GNSS may include the GPS, the Global Navigation Satellite System (GLONASS), the BeiDou Navigation Satellite System, the Galileo system, the Indian Regional Navigation Satellite System (IRNSS or NavIC), the Quasi-Zenith Satellite System (QZSS), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
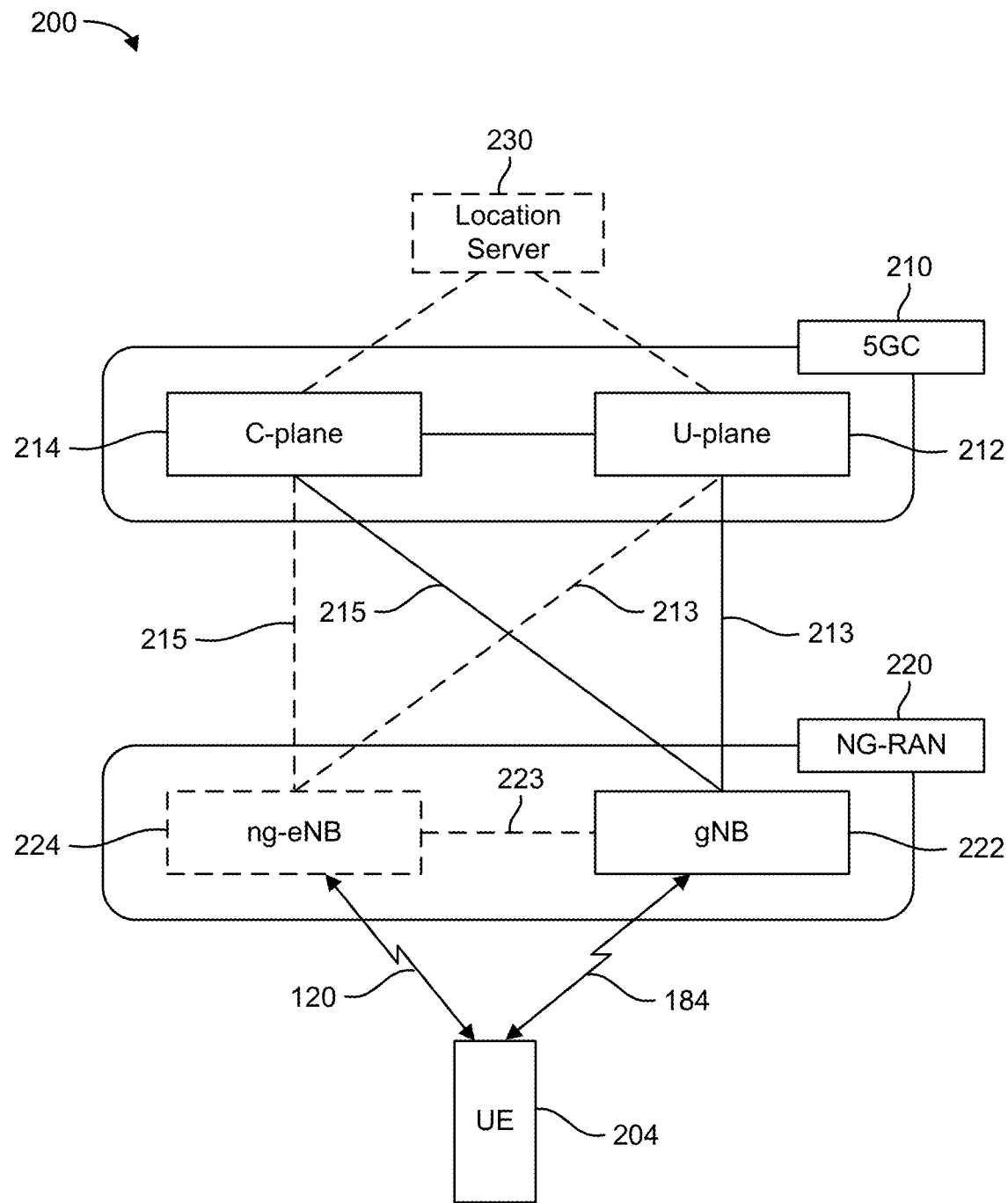
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
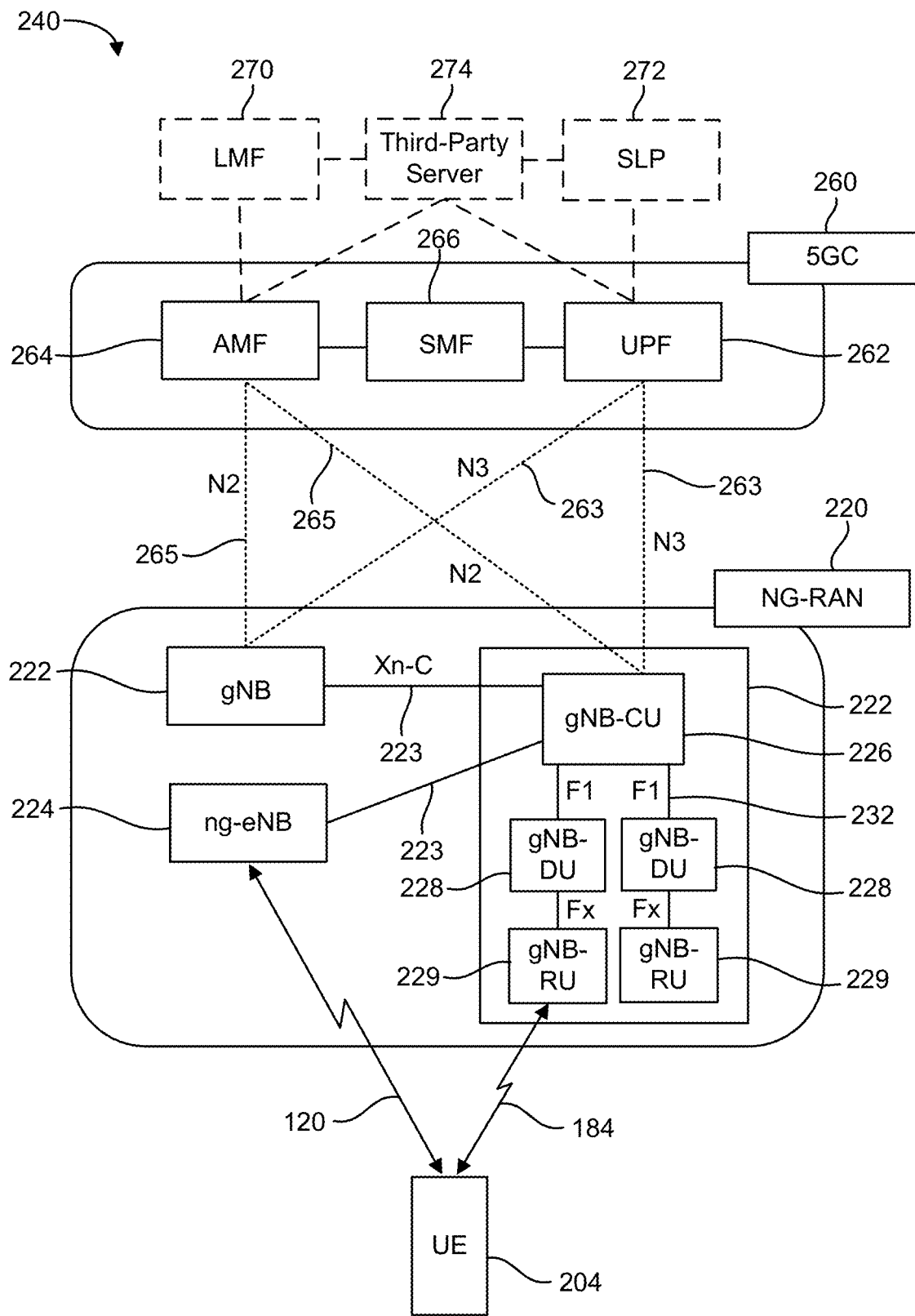

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
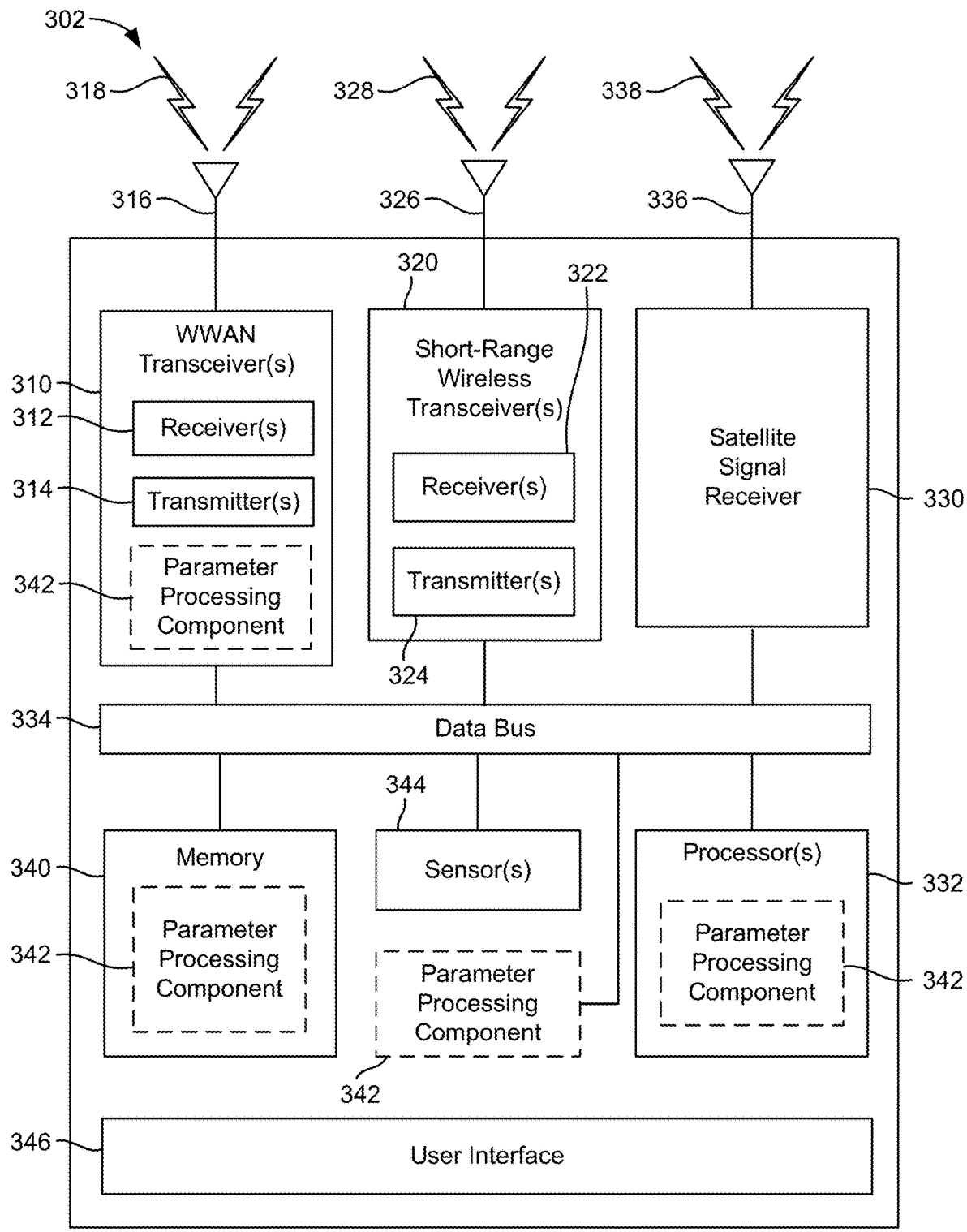
FIGS. 3A, 3B, and 3C are simplified block diagrams of several sample aspects of components that may be employed in a user equipment (UE), abase station, and a network entity, respectively, and configured to support communications as taught herein.
Figure 3B:
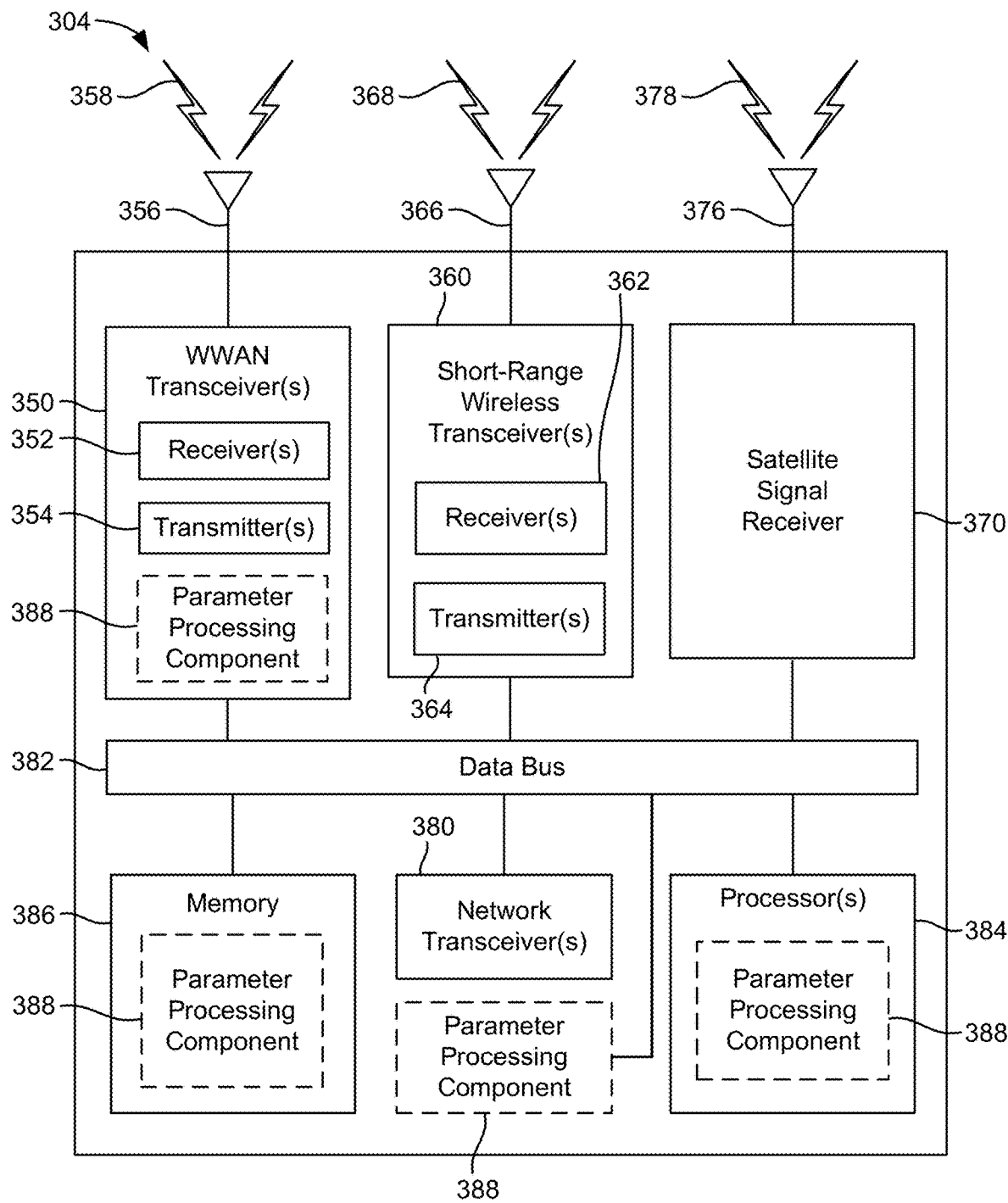
Figure 3C:
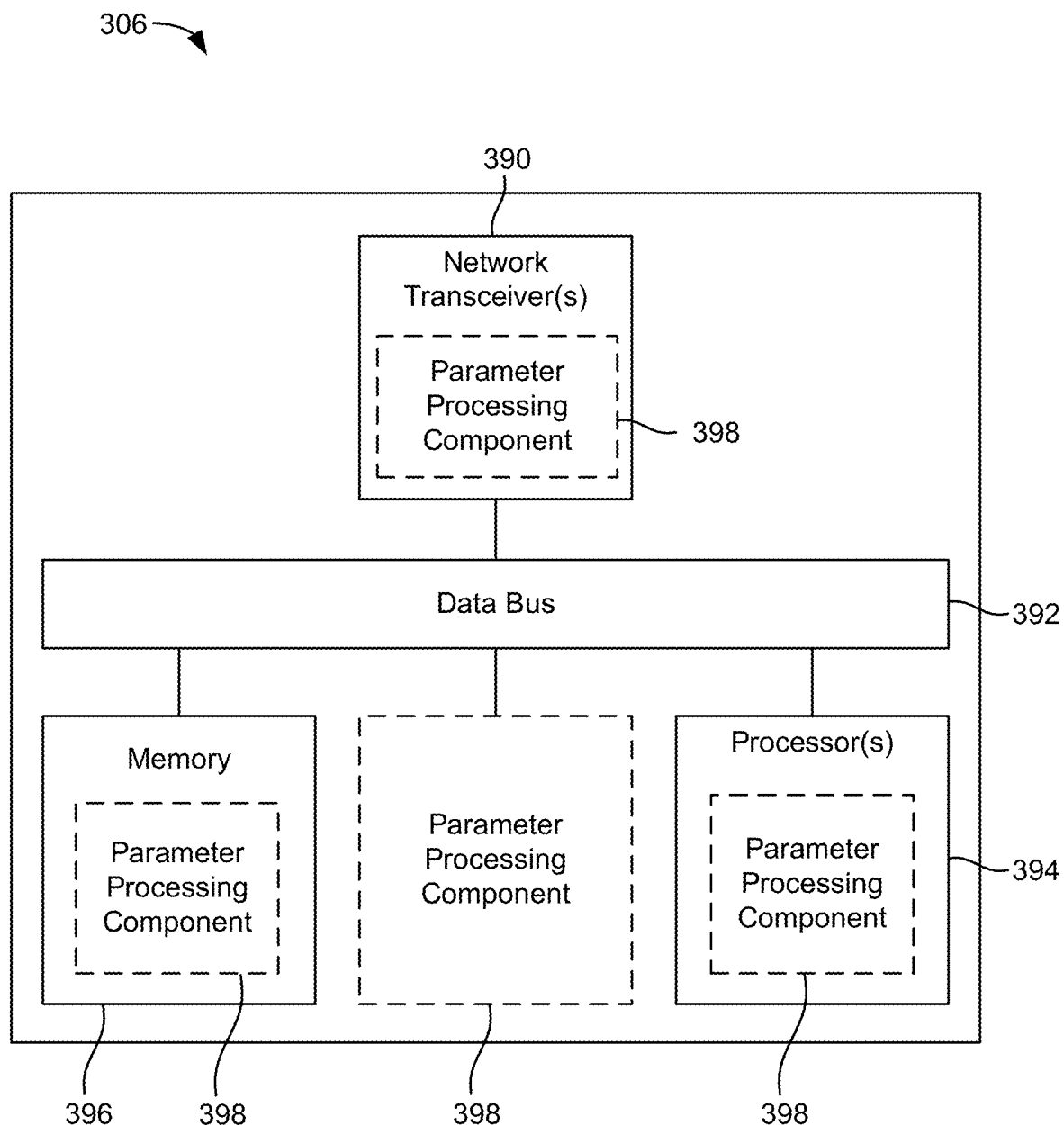

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be GPS signals, GLONASS signals, Galileo signals, Beidou signals, NAVIC signals, QZSS signals, etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include parameter processing component 342, 388, and 398, respectively. The parameter processing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the parameter processing component 342, 388, and 398 may be external to the processors 332, 384, and 394 (e.g., part of a modem processing system, integrated with another processing system, etc.). Alternatively, the parameter processing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the parameter processing component 342, which may be, for example, part of the one or more WWAN transceivers 310, the memory 340, the one or more processors 332, or any combination thereof, or may be a standalone component. FIG. 3B illustrates possible locations of the parameter processing component 388, which may be, for example, part of the one or more WWAN transceivers 350, the memory 386, the one or more processors 384, or any combination thereof, or may be a standalone component. FIG. 3C illustrates possible locations of the parameter processing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the parameter processing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
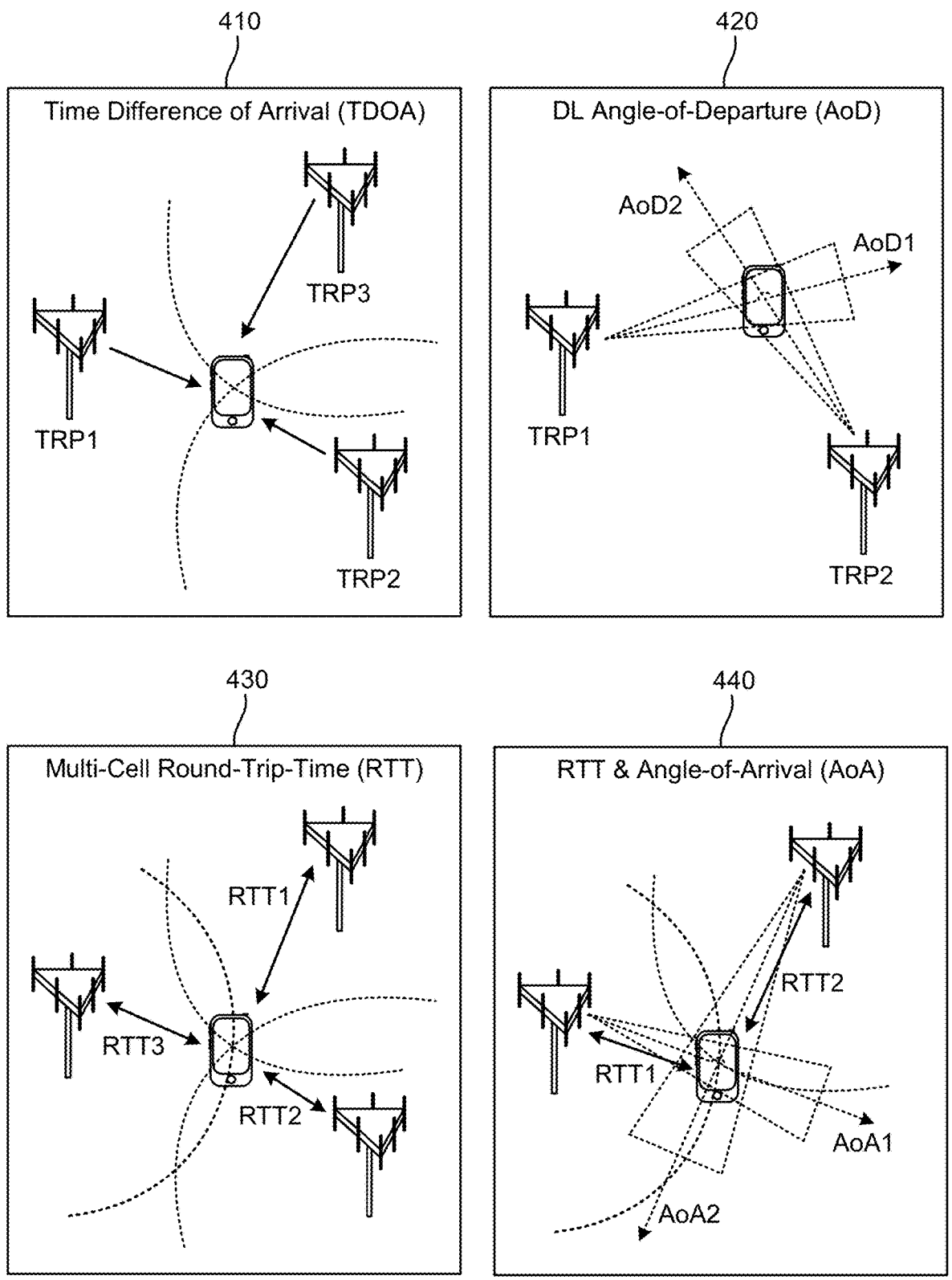
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5A:
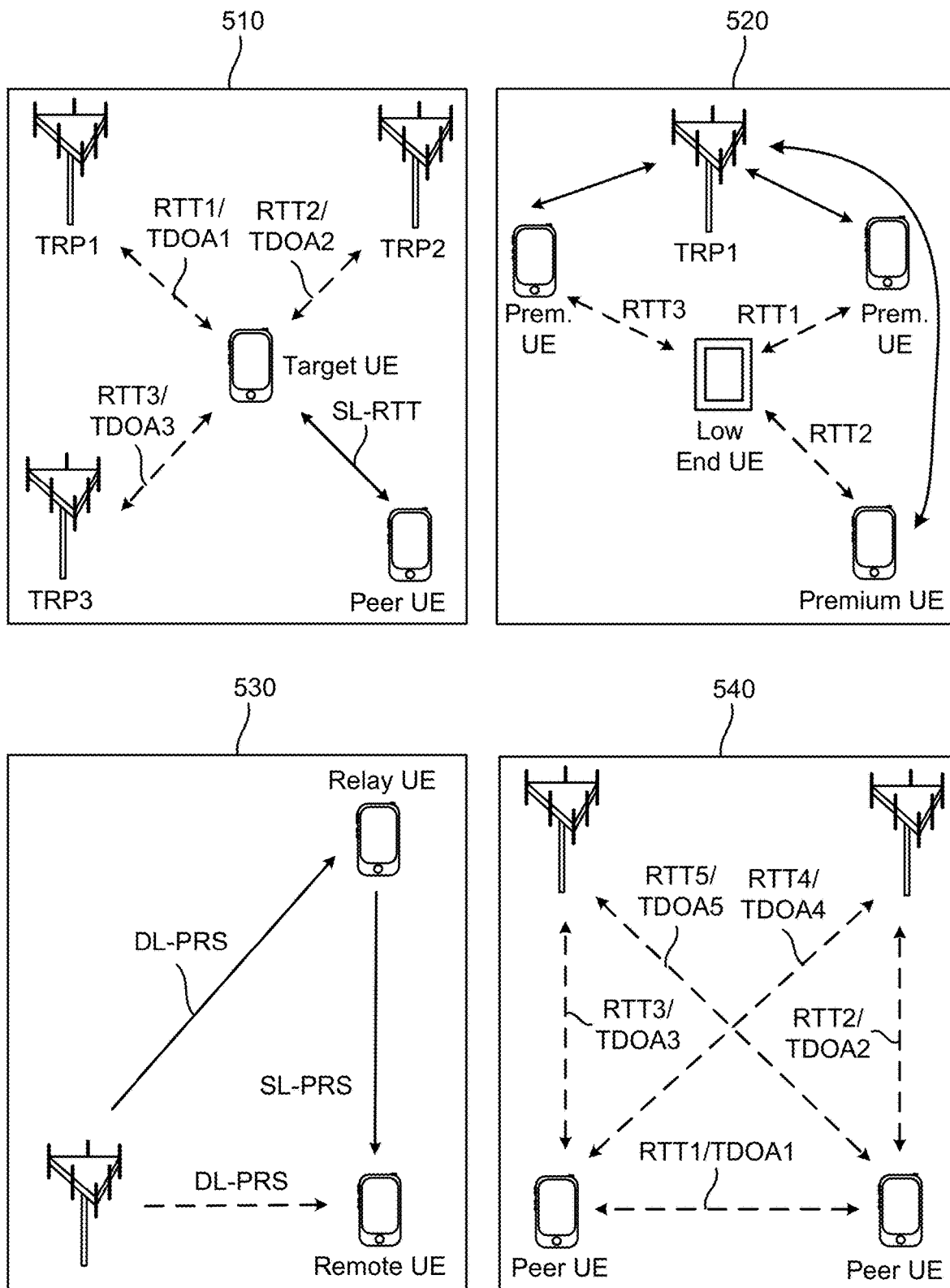
FIGS. 5A and 5B illustrate various scenarios of interest for sidelink-only or joint Uu and sidelink positioning, according to aspects of the disclosure.

NR supports, or enables, various sidelink positioning techniques. FIG. 5A illustrates various scenarios of interest for sidelink-only or joint Uu and sidelink positioning, according to aspects of the disclosure. In scenario 510, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 520, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 530, a relay UE (e.g., with a known location) participates in the positioning estimation of a remote UE without performing uplink positioning reference signal (PRS) transmission over the Uu interface. Scenario 540 illustrates the joint positioning of multiple UEs. Specifically, in scenario 540, two UEs with unknown positions can be jointly located in non-line-of-sight (NLOS) conditions by utilizing constraints from nearby UEs.

Figure 5B:
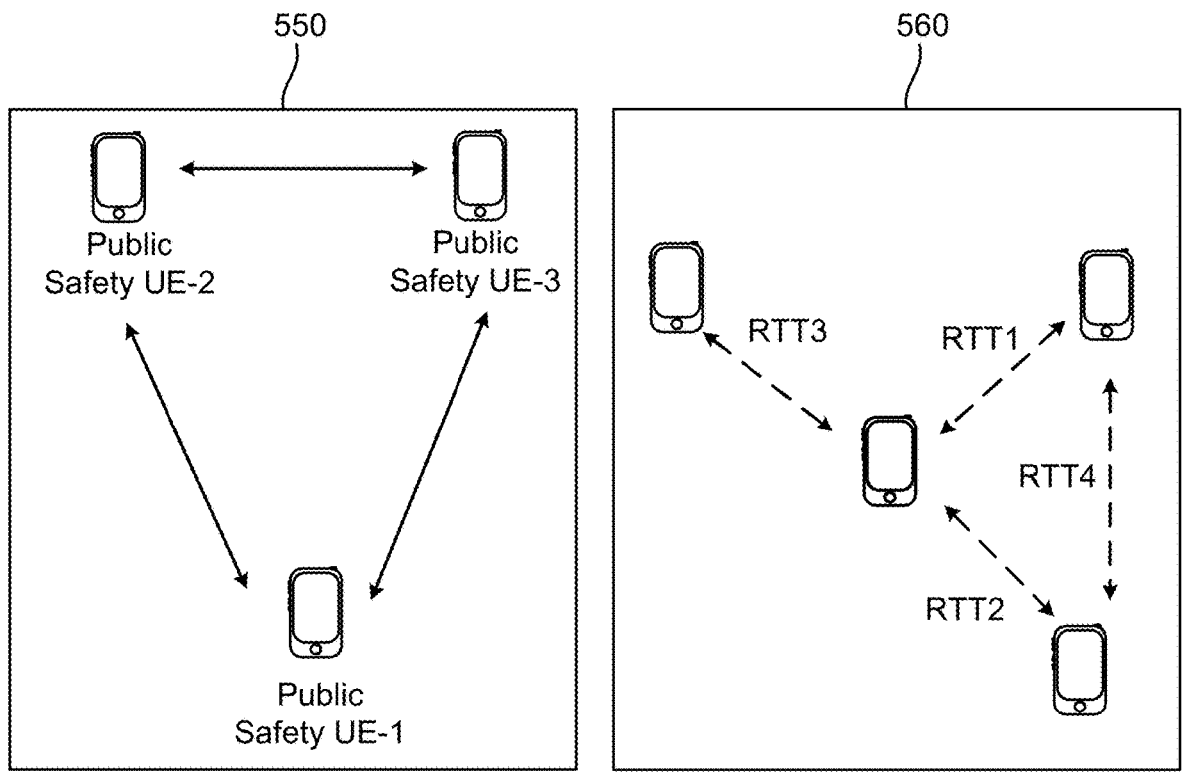

FIG. 5B illustrates additional scenarios of interest for sidelink-only or joint Uu and sidelink positioning, according to aspects of the disclosure. In scenario 550, UEs used for public safety (e.g., by police, firefighters, and/or the like) may perform peer-to-peer (P2P) positioning and ranging for public safety and other uses. For example, in scenario 550, the public safety UEs may be out of coverage of a network and determine a location or a relative distance and a relative position among the public safety UEs using sidelink positioning techniques. Similarly, scenario 560 shows multiple UEs that are out of coverage and determine a location or a relative distance and a relative position using sidelink positioning techniques, such as SL-RTT.

In some aspects, for NR V2X or sidelink communication, a number of sidelink signals or physical channels may be specified for transmission either in a cellular spectrum (i.e., SL shares spectrum in a licensed cellular band) or in a dedicated ITS spectrum. In some aspects, sidelink positioning may support not only relative positioning but also absolute positioning. While the relative positioning (e.g., based on ranging) may determine a distance between two UEs or relative locations of the two UEs, absolute positioning may determine the geographic coordinates of a wireless device (e.g., a target UE).

In some aspects, sidelink positioning may be performed based on measurements of a reference signal, such as sidelink PRS (SL-PRS), Channel Status Information Reference Signal (CSI-RS), or SRS over SL. In some aspects, the reference signal for sidelink positioning may be transmitted over sidelink. In some aspects, the sidelink positioning may be performed based on measurements of ToA, TDoA, AoA, RTT, or the like, of the reference signal (e.g., SL-PRS, CSI-RS, or SRS over SL).

In some aspects, some V2X or sidelink applications may have a very high accuracy requirements. For example, the requirement of a sub-meter level accuracy may be imposed for the application of vehicle maneuver coordination. Such accuracy requirements may be achieved by using a very large bandwidth (e.g., about 80 MHz or higher) PRS transmission. In some aspects, sidelink positioning of a target UE with an anchor UE when the two UEs have a NLOS condition may have a significantly decreased accuracy than having a line-of-sight (LOS) condition.

In some aspects, a type of wireless device or UE known as a roadside unit (RSU) may be placed at a known location for sidelink positioning. In some examples, the RSUs may be a significant part of V2X networks and/or ecosystems. In some examples, an RSU may be installed along a road and/or collocated with a traffic observation or control devices (e.g., traffic lights in urban streets or the like). For example, for positioning, an RSU with a known location may serve as a positioning anchor and may perform absolution or relative (e.g., ranging) sidelink positioning of a target UE, such as a vehicle UE.

In some aspects, one of the sidelink positioning use cases is to determine the absolute position of the target UE based on measurements from multiple RSUs or measurements of reference signals from multiple RSUs.

In some aspects, one of the sidelink positioning use cases is to improve the accuracy of the absolute positioning of a vehicle UE, which can be a positioning estimation procedure different from the sidelink positioning. For example, a vehicle UE may perform the absolute positioning based on the GNSS. However, the GNSS may not be very accurate in the urban scenarios due to reflections of the GNSS signals, blockage of signal paths, etc., by buildings. In some aspects, measurements from sidelink positioning with an RSU (or a SL UE at a known location) may be used as another input to be fused with the GNSS positioning result (also referred to as "positioning fusion" in this disclosure) to improve positioning accuracy. In some aspects, positioning fusion may be performed based on a weighted combination of the coordinates determined by two or more different positioning procedures.

In some aspects, for determining a position of a target UE, the sidelink positioning with a SL UE (e.g., an RSU) may not always be needed or performed to assist (or to be fused with) the positioning result of another, not sidelink-based, positioning estimation procedure. According to one or more aspects of this disclosure, the SL UE (or an RSU) with a known location may transmit one or more parameters indicating one or more characteristics regarding a sidelink positioning operation with the SL UE or regarding a surrounding environment of the SL UE, such that the target UE may determine how to apply a result of the sidelink positioning operation for enhanced positioning accuracy.

Figure 6A:
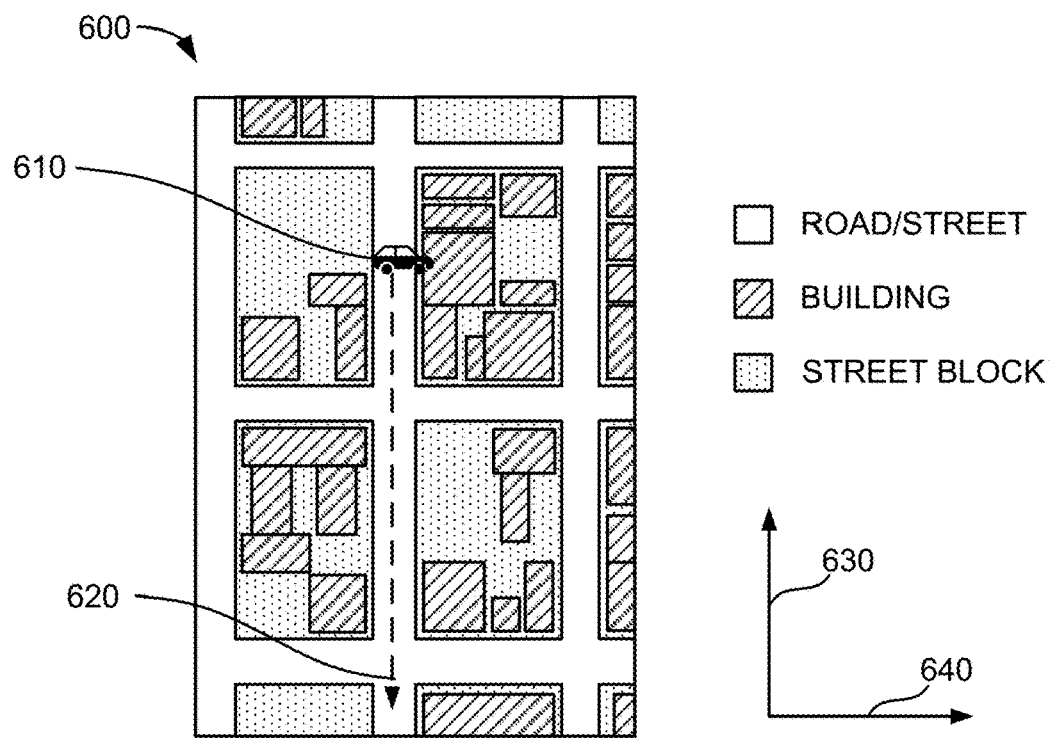
FIG. 6A illustrates a map showing a target UE in an urban scenario, according to various aspects of the disclosure.

FIG. 6A illustrates a map 600 showing a target UE 610 in an urban scenario, according to various aspects of the disclosure. In this example, the target UE 610 may be a vehicle UE moving along a path 620 that is parallel to a first direction 630. In this example, when the target UE 610 moves along the path 620, the target UE also performs positioning estimation procedures based on the GNSS. The positions of the target UE 610 determined based on the GNSS may include components along the first direction 630 and components along a second direction 640. In some aspects, the first direction 630 may correspond to a latitude direction, and the second direction 640 may correspond to a longitude direction.

Figure 6B:
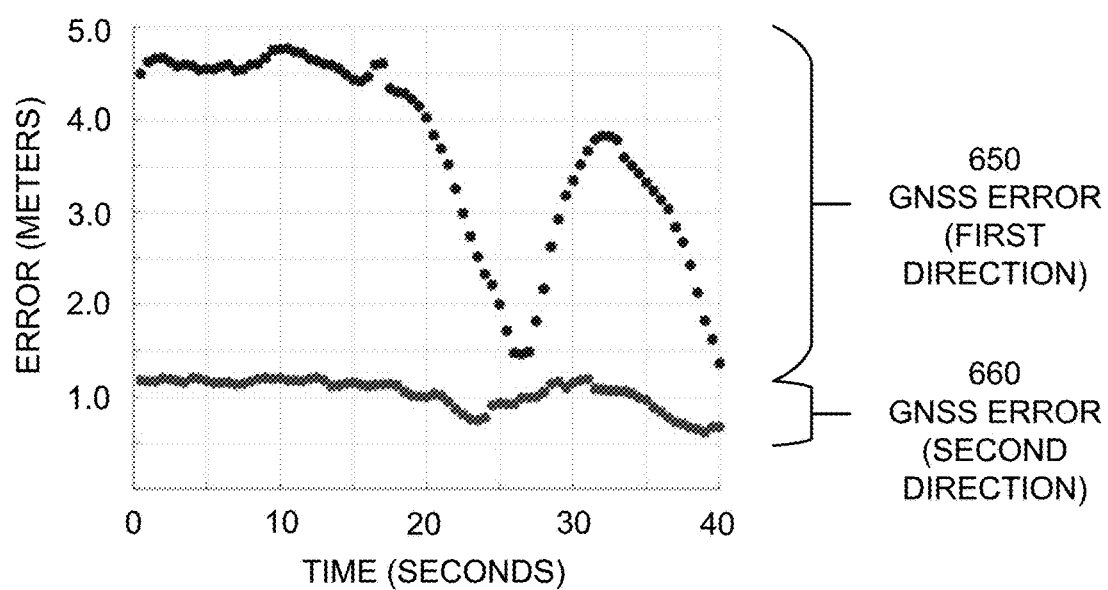
FIG. 6B illustrates positioning errors of the global navigation satellite system (GNSS) positioning estimation of the target UE in FIG. 6A, according to various aspects of the disclosure.

FIG. 6B illustrates positioning errors of the GNSS positioning estimation of the target UE in FIG. 6A, according to various aspects of the disclosure. While the target UE 610 moving along the path 620, the positions of the target UE 610 may be determined based on the GNSS at different time points. As shown in FIG. 6B, in this example, the GNSS errors 650 for the positioning estimation along the first direction (e.g., the latitude direction) are significantly more than the GNSS errors 660 for the positioning estimation along the second direction (e.g., the longitude direction).

In some aspects, an RSU may be deployed on the road along the path 620 (e.g., for ensuring the LOS condition with the RSU for vehicle UEs on this road) to improve vehicle absolute positioning performance by the positioning fusion. In some aspects, the sidelink positioning with this deployed RSU may directly improve latitude positioning accuracy for the vehicle UEs on the road along the path 620.

In some aspects, the vehicle UEs on other streets or roads may also discover this RSU deployed on the road along the path 620 or receive the SL-PRS from this RSU, and may perform sidelink positioning with this RSU. However, the vehicle UEs on other streets or roads may likely not have the LOS to this RSU, and the sidelink postponing under the NLOS condition may not significantly improve the positioning accuracy.

In some aspects, a LOS determination process may be implemented such that the RSU and/or the target UE may determine whether or how to utilize the sidelink positioning results. For example, if there is no LOS, the target UE may decide not to use the sidelink positioning results or not to perform the sidelink positioning at all in order to improve the overall performance or power consumption, e.g., by avoiding spending computational resources on operations that are unlikely to improve positioning accuracy. However, identifying the presence or absence of the LOS condition could be challenging in real world implementations, may require additional hardware and/or more complex implementation, may not be sufficiently accurate, and may even cost more computational resources than it may save. Accordingly, the RSU (or a sidelink device as an anchor node) may transmit certain parameters to the target UE in order to simplify the decision-making process for implementing the positioning fusion using the result of the sidelink positioning.

In some aspects, the RSU may signal one or multiple parameters over sidelink. The parameters may be used by a wireless device (e.g., the target UE 610) to determine whether to perform sidelink positioning with the RSU and/or whether or to what extent to trust or utilize the sidelink positioning results.

In some aspects, the one or more parameters may include: a distance threshold indicating a range within which fusing the result of a positioning estimation procedure of the wireless device (e.g., based on GNSS, radar, or other positioning methods) and a result of the sidelink positioning operation with the RSU is recommended; one or more allowed zone identifiers indicating one or more allowed zones within which fusing the result of the positioning estimation procedure of the wireless device and the result of the sidelink positioning operation with the RSU is recommended; one or more blocked zone identifiers indicating one or more blocked zones within which fusing the result of the positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of the positioning estimation procedure of the wireless device and the result of the sidelink positioning operation with the RSU is recommended; an auxiliary accuracy indicator indicating an expected accuracy level of the positioning estimation procedure in a vicinity of the RSU; or any combination thereof.

In some aspects, the one or more parameters may be provided from the RSU to the wireless device via V2X application layer signaling; upper layer signaling including system architecture (SA) signaling; lower layer signaling or RAN level signaling including RRC, MAC Control Element (MAC CE), or PHY; or any combination thereof. In some aspects, the wireless device may receive the one or more parameters transmitted by the RSU in a broadcast manner; transmitted by the RSU during exchange of information for establishing a sidelink positioning session; transmitted by the RSU during exchange of measurements for the sidelink positioning session; or any combination thereof. In some aspects, the wireless device may send, to the RSU, a request for the one or more parameters, and the wireless device may receive the one or more parameters that are transmitted by the RSU in response to the request.

In some aspects, the RSU may determine the one or more parameters based on one or more pre-configured parameter values stored in the RSU, one or more received parameter values from a server, one or more measurements performed by the RSU, or any combination thereof. In some examples, the one or more parameters may be signaled to the RSU via the Uu interface from a base station, and the one or more parameters may be configured by the base station or a server (e.g. an Operation, Administration, and Maintenance (OAM) server) coupled with the base station. In some examples, the one or more parameters may be determined by the RSU based on field measurements (e.g., measurements performed when installing the RSU) which reflects the situation of that RSU (e.g., width of the road, layout or height of surrounding buildings, etc.).

In some aspects, the wireless device (e.g., the target UE 610) may determine not to perform the sidelink positioning with the RSU if condition(s) indicated or implied by the one or more parameters cannot be met. In some aspects, the wireless device may perform the sidelink positioning with the RSU, but the wireless device may determine whether to utilize the sidelink positioning results, or to what extent the results can be trusted.

For example, based on the one or more parameters, the wireless device may selectively execute one or more of: performing the sidelink positioning operation with the RSU; using the RSU as an anchor device for the positioning estimation procedure of the wireless device; adjusting an estimated position of the wireless device based on the result of the sidelink positioning operation with the RSU; determining an expected accuracy level of the positioning estimation procedure of the wireless device; or any combination thereof.

In some aspects, the one or more parameters may include a distance threshold. The wireless device (e.g., the target UE 610) may determine a distance between the wireless device and the RSU, and fuse the result of the positioning estimation procedure of the wireless device and the result of the sidelink positioning operation with the RSU based on the distance threshold being greater than the distance. In some aspects, the distance threshold may be provided in a unit of distance (e.g., meters) or in the form of an RTT measurement threshold in a unit of time (e.g., seconds).

In some examples, the wireless device when determining the distance between the wireless device and the RSU may obtain first location information of the wireless device, obtain second location information of the RSU via the sidelink communication, and determine the distance based on the first location information and the second location information. In some examples, the wireless device when determining the distance between the wireless device and the RSU may determine the distance based on performing the sidelink positioning process with the RSU, such as sidelink positioning performed based on measurements of ToA, TDoA, AoA, RTT, or the like, of the reference signal (e.g., SL-PRS, CSI-RS, or SRS over SL).

In some aspect, the larger the distance between the wireless device and the RSU, the more likely the wireless and the RSU has the NLOS condition. In some aspects, the distance threshold as a simplified indicator for distinguishing the LOS condition and the NLOS condition may be location or scenario specific. For example, the distance threshold for being NLOS may be smaller in a street with more tall buildings on each side or with smaller road area, etc.

In some aspects, the one or more parameters may include an allowed zone identifier or a blocked zone identifier. The wireless device (e.g., the target UE 610) may determine a device zone identifier of the wireless device, and fuse the result of the positioning estimation procedure of the wireless device and the result of the sidelink positioning operation with the RSU based on the device zone identifier matching the allowed zone identifier or the device zone identifier not matching the blocked zone identifier.

In some examples, the wireless device when determining the device zone identifier of the wireless device may obtain first location information of the wireless device, and mapping the first location information to the device zone identifier based on a mapping relationship. In some examples, the mapping relationship may be similar to the zone ID designated in an existing V2X standard, where geographic coordinates may be converted to corresponding zone IDs based on an equation. In some examples, the mapping relationship may be a proprietary mapping table or equation that is specifically applicable to an area, a map, an application provider, or a network provider. For example, the zone identifiers may be based on different streets or roads as shown in FIG. 6A, and a vehicle UE may be prohibited or discouraged to use a RSU when the vehicle UE and the RSU are on different roads or streets, according to the zone identifiers. In some examples, the zone identifiers may represent the zones that are not in good coverage of the RSU, and the vehicle UE may be prohibited or discouraged to use the RSU when the vehicle UE is at a zone that does not have a good coverage of the RSU according to the zone identifiers.

In some aspects, the one or more parameters may include an accuracy indicator indicating an expected accuracy level of the sidelink positioning operation with the RSU. The wireless device (e.g., the target UE 610) may fuse the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

In some examples, the accuracy indicator may include an expected ranging error (e.g., in a unit of distance or in a unit of time) of the sidelink positioning operation with the RSU; one or more standard deviations of the expected ranging error of the sidelink positioning operation with the RSU in association with one or more respective positioning reference signal bandwidths; one or more confidence levels or one or more confidence intervals of the expected ranging error of the sidelink positioning operation with the RSU in association with the one or more respective positioning reference signal bandwidths; or any combination thereof. In some examples, the accuracy indicator may be provided as an average value or a maximum value within a predetermined time interval.

In one example, the RSU may indicate an error value X (meters) to the wireless device, which is the max (or mean) ranging error the wireless device should expect if it performs the SL ranging with the RSU. In one example, the RSU may indicate that with Y MHz SL PRS bandwidth, the standard deviation of SL ranging error is X meters. In one example, the RSU may indicate that with Y MHz SL PRS bandwidth, the expected SL ranging error with the RSU is X meters with confidence of Z % (or confidence interval Z1%~Z2%). In one example, the RSU may indicate that with Y MHz SL PRS bandwidth, the expected SL ranging error is X1 meters if measured range is smaller than R1, X2 meters if measured range is smaller than R2, etc.

In some aspects, the one or more parameters may include a direction indicator indicating a positioning direction. The wireless device (e.g., the target UE 610) may fuse a directional component of the result of the positioning estimation procedure of the wireless device (e.g., determined by another positioning operation like the GNSS or radar detection) and a directional component of the result of the sidelink positioning operation with the RSU along the positioning direction indicated by the direction indicator. In some example, the positioning direction indicated by the direction indicator may be a latitude direction and/or a longitude direction.

For example, one use case of sidelink positioning is location fusion, where distance and/or location obtained from sidelink positioning may be fused with distance/location obtained via other means (e.g., GNSS, radar, etc.) to improve positioning accuracy. As an example, the RSU may be installed on a north-south street; then, the sidelink ranging with the RSU may be used to improve latitude accuracy only (similarly, RSU on east-west street may be used to improve longitude accuracy only). The RSU may indicate whether range measured from the RSU can be used to improve latitude accuracy and/or longitude accuracy.

In some aspects, the one or more parameters may include an auxiliary accuracy indicator indicating an expected accuracy level of the positioning estimation procedure in a vicinity of the RSU. The wireless device (e.g., the target UE 610) may fuse the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the second wireless device.

In some examples, the auxiliary accuracy indicator may be presented as a variance of positioning error, which may be provided as an average value or a maximum value within a predetermined time interval. In some examples, when the another positioning operation is based on the GNSS, the positioning error variance may be location dependent. For example, the GNSS positioning error variance may be larger in some streets than others (due to building layout around that street, road area, etc.). In some examples, the second wireless device (e.g., an RSU) may provide the GNSS positioning error variance to the UEs in the RSU's vicinity.

In some aspects, in positioning fusion of SL ranging measurements and GNSS geo measurements, the fusion engine may need to know how accurate GNSS geo measurements are. For example, the fusion engine may need to know variance of GNSS location error, which may be usually location dependent. In some examples, the GNSS location error variance may be larger in some streets than others (due to building layout around that street, road area, etc.). In some aspects, the RSU may indicate the GNSS location error variance (e.g., average or max value) to the UEs in its vicinity.

In some aspects, the one or more parameters may include other information that is not directly related to the sidelink positioning operation with the RSU, but may provide additional information regarding the environment in the vicinity of the RSU for the wireless device or the fusion engine to process or adjust the positioning estimation procedure of the wireless device.

Figure 7:
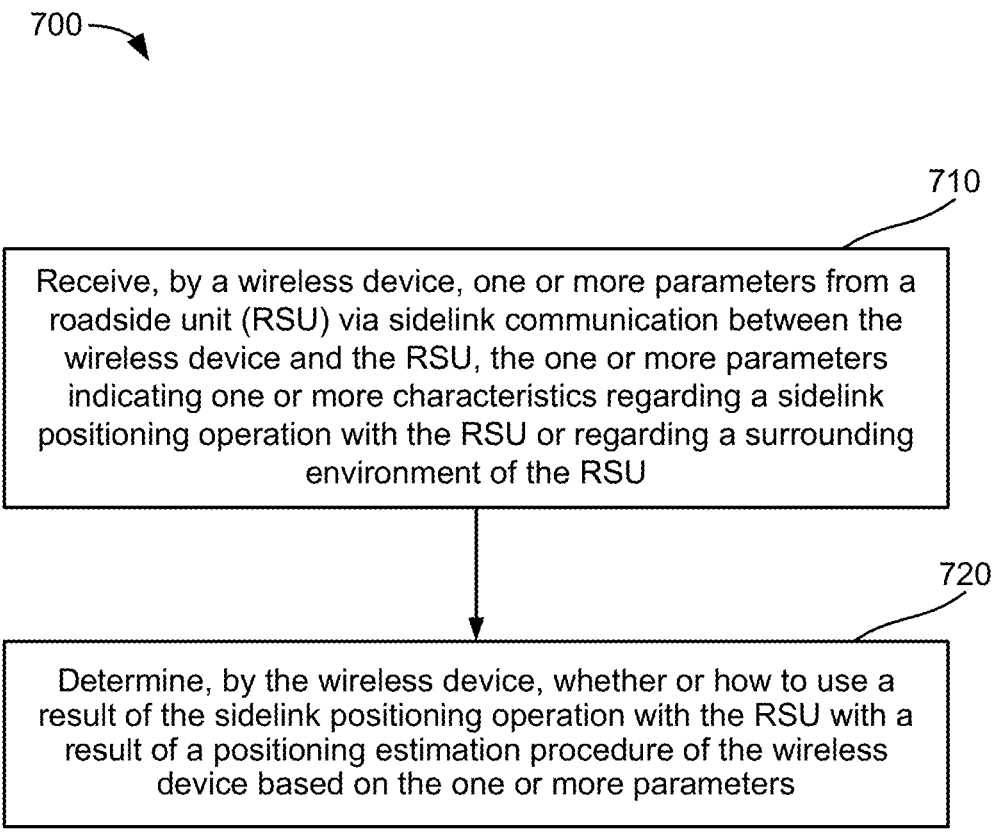
FIG. 7 illustrates an example method of operating a wireless device for a positioning estimation procedure of the wireless device, according to aspects of the disclosure.

FIG. 7 illustrates an example method 700 of operating a wireless device (e.g., a target device or a target UE) for a positioning estimation procedure of the wireless device, according to aspects of the disclosure. In some aspects, method 700 may be performed by a UE (e.g., any of the UE described herein).

At operation 710, the wireless device receives one or more parameters from a roadside unit (RSU) (or an SL UE) via sidelink communication between the wireless device and the RSU. The one or more parameters may indicate one or more characteristics regarding a sidelink positioning operation with the RSU or regarding a surrounding environment of the RSU. In some aspects, the RSU may signal one or multiple parameters over sidelink, such as the non-limiting examples illustrated above. In an aspect, operation 710 may be performed by the one or more WWAN transceivers 310, the one or more processors 332, memory 340, and/or parameter processing component 342, any or all of which may be considered means for performing one or more of the following operations of operation 710.

At operation 720, after receiving the one or more parameters, the wireless device determines whether or how to use the result of the sidelink positioning operation with the RSU with the result of the positioning estimation procedure of the wireless device based on the one or more parameters. In some aspects, the wireless device may determine whether to perform sidelink positioning with the RSU and/or whether or to what extent to trust or utilize the sidelink positioning results, such as the non-limiting examples as illustrated above. In an aspect, operation 720 may be performed by the one or more WWAN transceivers 310, the one or more processors 332, memory 340, and/or parameter processing component 342, any or all of which may be considered means for performing one or more of the following operations of operation 720.

As will be appreciated, a technical advantage of the method 700 is to allow the target UE (e.g., the wireless device in method 700) to more efficiently determine whether to apply a result of a sidelink positioning operation with an SL device (e.g., the RSU in method 700) or how to apply the result of the sidelink positioning operation with the SL device for enhanced positioning accuracy, based on one or more parameters provided by the SL device.

Figure 8:
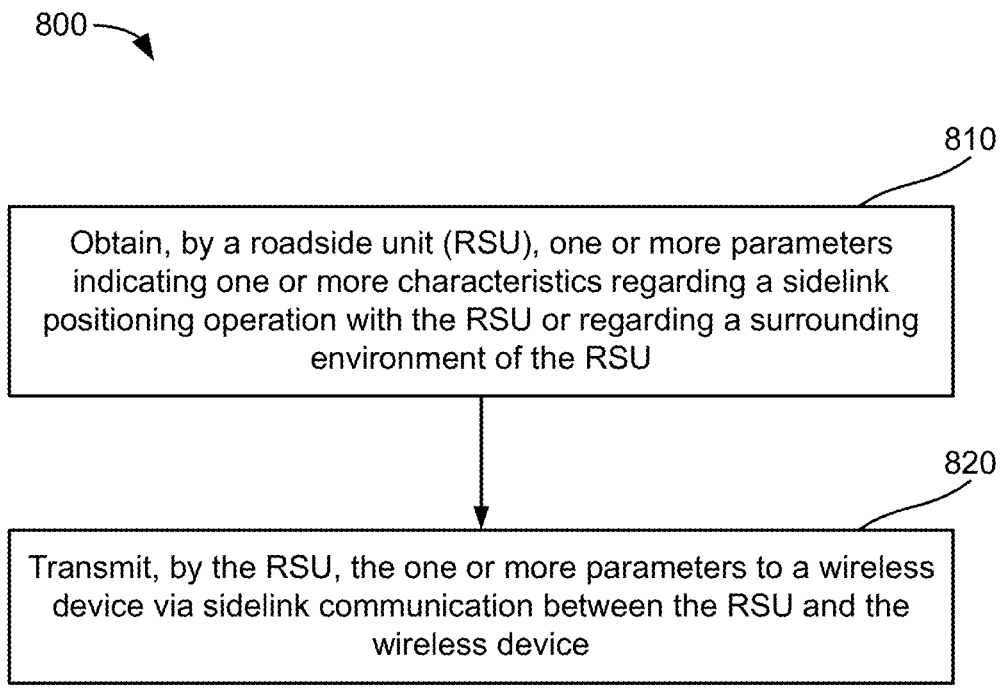
FIG. 8 illustrates an example method of operating a roadside unit (RSU) for a positioning estimation procedure of a wireless device, according to aspects of the disclosure.

FIG. 8 illustrates an example method 800 of operating and RSU (e.g., an SL device or an anchor device) for a positioning estimation procedure of a wireless device (e.g., a target device), according to aspects of the disclosure. In some aspects, method 800 may be performed by a SL UE (e.g., any of the UE described herein) or a RSU.

At operation 810, the RSU obtains one or more parameters indicating one or more characteristics regarding a sidelink positioning operation with the RSU or regarding a surrounding environment of the RSU. In some aspects, the one or more parameters may be the one or more parameters as illustrated above and may be obtained as illustrated above. In an aspect, operation 810 may be performed by the one or more WWAN transceivers 310, the one or more processors 332, memory 340, and/or parameter processing component 342, any or all of which may be considered means for performing one or more of the following operations of operation 810.

At operation 820, after obtaining the one or more parameters, the RSU transmits the one or more parameters to a wireless device (e.g., a target UE) via sidelink communication between the RSU and the wireless device. In some aspects, the one or more parameters enable the wireless device to determine whether or how to use a result of the sidelink positioning operation with the RSU with a result of a positioning estimation procedure of the wireless device based on the one or more parameters. In some aspects, the transmission of the one or more parameters may be performed as illustrated above. In an aspect, operation 820 may be performed by the one or more WWAN transceivers 310, the one or more processors 332, memory 340, and/or parameter processing component 342, any or all of which may be considered means for performing one or more of the following operations of operation 820.

In some aspects, as illustrated with reference to FIGS. 6A and 6B, the target UE may determine not to perform the sidelink positioning with the RSU or the anchor device if condition(s) indicated or implied by the one or more parameters cannot be met. In some aspects, the target UE may performs the sidelink positioning with the RSU or the anchor device, but the target UE may determine whether to utilize the sidelink positioning results, or to what extent the results can be trusted.

As will be appreciated, a technical advantage of the method 800 is to allow the target UE (e.g., the wireless device in method 800) to more efficiently determine whether to apply a result of a sidelink positioning operation with an SL device (e.g., the RSU in method 800) or how to apply the result of the sidelink positioning operation with the SL device for enhanced positioning accuracy, based on one or more parameters provided by the SL device.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a wireless device, comprising: receiving one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determining whether or how to use a result of the sidelink positioning operation with the RSU with a result of a positioning estimation procedure of the wireless device based on the one or more parameters.

Clause 2. The method of clause 1, wherein the one or more parameters comprises: a distance threshold indicating a range within which fusing the result of the positioning estimation procedure of the wireless device and the result of the sidelink positioning operation with the RSU is recommended; one or more allowed zone identifiers indicating one or more allowed zones within which fusing the result of the positioning estimation procedure of the wireless device and the result of the sidelink positioning operation with the RSU is recommended; one or more blocked zone identifiers indicating one or more blocked zones within which fusing the result of the positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of the positioning estimation procedure of the wireless device and the result of the sidelink positioning operation with the RSU is recommended; an auxiliary accuracy indicator indicating an expected accuracy level of the positioning estimation procedure in a vicinity of the RSU; or any combination thereof.

Clause 3. The method of any of clauses 1 to 2, further comprising, based on the one or more parameters: performing the sidelink positioning operation with the RSU; using the RSU as an anchor device for the positioning estimation procedure of the wireless device; adjusting an estimated position of the wireless device based on the result of the sidelink positioning operation with the RSU; determining an expected accuracy level of the positioning estimation procedure of the wireless device; or any combination thereof.

Clause 4. The method of any of clauses 1 to 3, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 5. The method of any of clauses 1 to 4, wherein the receiving the one or more parameters comprises: receiving the one or more parameters transmitted by the RSU in a broadcast manner; receiving the one or more parameters transmitted by the RSU during exchange of information for establishing a sidelink positioning session; receiving the one or more parameters transmitted by the RSU during exchange of measurements for the sidelink positioning session; or any combination thereof.

Clause 6. The method of any of clauses 1 to 5, further comprising: sending, to the RSU, a request for the one or more parameters, wherein the receiving the one or more parameters comprises receiving the one or more parameters transmitted by the RSU in response to the request.

Clause 7. The method of clause 1, wherein: the one or more parameters comprise a distance threshold, and the determining whether or how to use the result of the sidelink positioning operation comprises: determining a distance between the wireless device and the RSU; and fusing the result of the positioning estimation procedure of the wireless device and the result of the sidelink positioning operation with the RSU based on the distance threshold being greater than the distance.

Clause 8. The method of clause 7, wherein the determining the distance between the wireless device and the RSU comprises: obtaining first location information of the wireless device; obtaining second location information of the RSU via the sidelink communication; and determining the distance based on the first location information and the second location information.

Clause 9. The method of clause 7, wherein the determining the distance between the wireless device and the RSU comprises: determining the distance based on performing the sidelink positioning operation with the RSU.

Clause 10. The method of clause 1, wherein: the one or more parameters comprise an allowed zone identifier or a blocked zone identifier, and the determining whether or how to use the result of the sidelink positioning operation comprises: determining a device zone identifier of the wireless device; and fusing the result of the positioning estimation procedure of the wireless device and the result of the sidelink positioning operation with the RSU based on the device zone identifier matching the allowed zone identifier or the device zone identifier not matching the blocked zone identifier.

Clause 11. The method of clause 10, wherein the determining the device zone identifier of the wireless device comprises: obtaining first location information of the wireless device; and mapping the first location information to the device zone identifier based on a mapping relationship.

Clause 12. The method of clause 1, wherein: the one or more parameters comprise an accuracy indicator indicating an expected accuracy level of the sidelink positioning operation with the RSU, and the determining whether or how to use the result of the sidelink positioning operation comprises: fusing the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

Clause 13. The method of clause 12, wherein the accuracy indicator comprises: an expected ranging error of the sidelink positioning operation with the RSU; one or more standard deviations of the expected ranging error of the sidelink positioning operation with the RSU in association with one or more respective positioning reference signal bandwidths; one or more confidence levels or one or more confidence intervals of the expected ranging error of the sidelink positioning operation with the RSU in association with the one or more respective positioning reference signal bandwidths; or any combination thereof.

Clause 14. The method of clause 1, wherein: the one or more parameters comprise a direction indicator indicating a positioning direction, and the determining whether or how to use the result of the sidelink positioning operation comprises: fusing a directional component of the result of the positioning estimation procedure of the wireless device and a directional component of the result of the sidelink positioning operation with the RSU along the positioning direction indicated by the direction indicator.

Clause 15. The method of clause 14, wherein the positioning direction indicated by the direction indicator comprises a latitude direction or a longitude direction.

Clause 16. The method of clause 1, wherein: the one or more parameters comprise an auxiliary accuracy indicator indicating an expected accuracy level of the positioning estimation procedure in a vicinity of the RSU, and the determining whether or how to use the result of the sidelink positioning operation comprises: fusing the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the RSU.

Clause 17. A method of operating a roadside unit (RSU), comprising: obtaining one or more parameters indicating one or more characteristics regarding a sidelink positioning operation with the RSU or regarding a surrounding environment of the RSU; and transmitting the one or more parameters to a wireless device via sidelink communication between the RSU and the wireless device.

Clause 18. The method of clause 17, wherein the one or more parameters comprises: a distance threshold indicating a range within which fusing a result of a positioning estimation procedure of the wireless device and a result of the sidelink positioning operation with the RSU is recommended; one or more allowed zone identifiers indicating one or more allowed zones within which fusing the result of a positioning estimation procedure of the wireless device and the result of the sidelink positioning operation with the RSU is recommended; one or more blocked zone identifiers indicating one or more blocked zones within which fusing the result of a positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of a positioning estimation procedure of the wireless device and the result of the sidelink positioning operation with the RSU is not recommended; an auxiliary accuracy indicator indicating an expected accuracy level of the positioning estimation procedure in a vicinity of the RSU; or any combination thereof.

Clause 19. The method of any of clauses 17 to 18, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 20. The method of any of clauses 17 to 19, wherein the obtaining the one or more parameters is based on: one or more pre-configured parameter values stored in the RSU; one or more received parameter values from a server; one or more measurements performed by the RSU; or any combination thereof.

Clause 21. The method of any of clauses 17 to 20, further comprising: receiving, from the wireless device, a request for the one or more parameters, wherein the transmitting the one or more parameters is performed in response to the request.

Clause 22. A wireless device, comprising: a memory; at least one transceiver; and at least one processor communicatively coupled to the memory and the at least one transceiver, the at least one processor configured to: receive, via the at least one transceiver, one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determine whether or how to use a result of the sidelink positioning operation with the RSU with a result of a positioning estimation procedure of the wireless device based on the one or more parameters.

Clause 23. The wireless device of clause 22, wherein the one or more parameters comprises: a distance threshold indicating a range within which fusing the result of the positioning estimation procedure of the wireless device and the result of the sidelink positioning operation with the RSU is recommended; one or more allowed zone identifiers indicating one or more allowed zones within which fusing the result of the positioning estimation procedure of the wireless device and the result of the sidelink positioning operation with the RSU is recommended; one or more blocked zone identifiers indicating one or more blocked zones within which fusing the result of the positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of the positioning estimation procedure of the wireless device and the result of the sidelink positioning operation with the RSU is recommended; an auxiliary accuracy indicator indicating an expected accuracy level of the positioning estimation procedure in a vicinity of the RSU; or any combination thereof.

Clause 24. The wireless device of any of clauses 22 to 23, wherein the at least one processor is further configured to, based on the one or more parameters: perform the sidelink positioning operation with the RSU; use the RSU as an anchor device for the positioning estimation procedure of the wireless device; adjust an estimated position of the wireless device based on the result of the sidelink positioning operation with the RSU; determine an expected accuracy level of the positioning estimation procedure of the wireless device; or any combination thereof.

Clause 25. The wireless device of any of clauses 22 to 24, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 26. The wireless device of any of clauses 22 to 25, wherein the at least one processor is configured to receive the one or more parameters comprises the at least one processor is further configured to: receive, via the at least one transceiver, the one or more parameters transmitted by the RSU in a broadcast manner; receive, via the at least one transceiver, the one or more parameters transmitted by the RSU during exchange of information for establishing a sidelink positioning session; receive, via the at least one transceiver, the one or more parameters transmitted by the RSU during exchange of measurements for the sidelink positioning session; or any combination thereof.

Clause 27. The wireless device of any of clauses 22 to 26, wherein the at least one processor is configured to send, via the at least one transceiver, to the RSU, a request for the one or more parameters, and wherein the at least one processor configured to receive the one or more parameters comprises the at least one processor further configured to receive the one or more parameters transmitted by the RSU in response to the request.

Clause 28. The wireless device of clause 22, wherein: the one or more parameters comprise a distance threshold, and the at least one processor is configured to determine whether or how to use the result of the sidelink positioning operation comprises the at least one processor is further configured to: determine a distance between the wireless device and the RSU; and fuse the result of the positioning estimation procedure of the wireless device and the result of the sidelink positioning operation with the RSU based on the distance threshold being greater than the distance.

Clause 29. The wireless device of clause 28, wherein the at least one processor configured to determine the distance between the wireless device and the RSU comprises the at least one processor further configured to: obtain first location information of the wireless device; obtain second location information of the RSU via the sidelink communication; and determine the distance based on the first location information and the second location information.

Clause 30. The wireless device of clause 28, wherein the at least one processor configured to determine the distance between the wireless device and the RSU comprises the at least one processor further configured to: determine the distance based on performing the sidelink positioning operation with the RSU.

Clause 31. The wireless device of clause 22, wherein: the one or more parameters comprise an allowed zone identifier or a blocked zone identifier, and the at least one processor is configured to determine whether or how to use the result of the sidelink positioning operation comprises the at least one processor is further configured to: determine a device zone identifier of the wireless device; and fuse the result of the positioning estimation procedure of the wireless device and the result of the sidelink positioning operation with the RSU based on the device zone identifier matching the allowed zone identifier or the device zone identifier not matching the blocked zone identifier.

Clause 32. The wireless device of clause 31, wherein the at least one processor configured to determine the device zone identifier of the wireless device comprises the at least one processor further configured to: obtain first location information of the wireless device; and map the first location information to the device zone identifier based on a mapping relationship.

Clause 33. The wireless device of clause 22, wherein: the one or more parameters comprise an accuracy indicator indicating an expected accuracy level of the sidelink positioning operation with the RSU, and the at least one processor is configured to determine whether or how to use the result of the sidelink positioning operation comprises the at least one processor is further configured to: fuse the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

Clause 34. The wireless device of clause 33, wherein the accuracy indicator comprises: an expected ranging error of the sidelink positioning operation with the RSU; one or more standard deviations of the expected ranging error of the sidelink positioning operation with the RSU in association with one or more respective positioning reference signal bandwidths; one or more confidence levels or one or more confidence intervals of the expected ranging error of the sidelink positioning operation with the RSU in association with the one or more respective positioning reference signal bandwidths; or any combination thereof.

Clause 35. The wireless device of clause 22, wherein: the one or more parameters comprise a direction indicator indicating a positioning direction, and the at least one processor is configured to determine whether or how to use the result of the sidelink positioning operation comprises the at least one processor is further configured to: fuse a directional component of the result of the positioning estimation procedure of the wireless device and a directional component of the result of the sidelink positioning operation with the RSU along the positioning direction indicated by the direction indicator.

Clause 36. The wireless device of clause 35, wherein the positioning direction indicated by the direction indicator comprises a latitude direction or a longitude direction.

Clause 37. The wireless device of clause 22, wherein: the one or more parameters comprise an auxiliary accuracy indicator indicating an expected accuracy level of the positioning estimation procedure in a vicinity of the RSU, and the at least one processor is configured to determine whether or how to use the result of the sidelink positioning operation comprises the at least one processor is further configured to: fuse the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the RSU.

Clause 38. A roadside unit (RSU), comprising: a memory; at least one transceiver; and at least one processor communicatively coupled to the memory and the at least one transceiver, the at least one processor configured to: obtain one or more parameters indicating one or more characteristics regarding a sidelink positioning operation with the RSU or regarding a surrounding environment of the RSU; and transmit, via the at least one transceiver, the one or more parameters to a wireless device via sidelink communication between the RSU and the wireless device.

Clause 39. The RSU of clause 38, wherein the one or more parameters comprises: a distance threshold indicating a range within which fusing a result of a positioning estimation procedure of the wireless device and a result of the sidelink positioning operation with the RSU is recommended; one or more allowed zone identifiers indicating one or more allowed zones within which fusing the result of a positioning estimation procedure of the wireless device and the result of the sidelink positioning operation with the RSU is recommended; one or more blocked zone identifiers indicating one or more blocked zones within which fusing the result of a positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of a positioning estimation procedure of the wireless device and the result of the sidelink positioning operation with the RSU is not recommended; an auxiliary accuracy indicator indicating an expected accuracy level of the positioning estimation procedure in a vicinity of the RSU; or any combination thereof.

Clause 40. The RSU of any of clauses 38 to 39, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 41. The RSU of any of clauses 38 to 40, wherein the at least one processor is configured to obtain the one or more parameters based on: one or more pre-configured parameter values stored in the RSU; one or more received parameter values from a server; one or more measurements performed by the RSU; or any combination thereof.

Clause 42. The RSU of any of clauses 38 to 41, wherein the at least one processor is further configured to: receive, via the at least one transceiver, from the wireless device, a request for the one or more parameters, wherein the at least one processor is configured to transmit the one or more parameters in response to the request.

Clause 43. A wireless device, comprising: means for receiving one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and means for determining whether or how to use a result of the sidelink positioning operation with the RSU with a result of a positioning estimation procedure of the wireless device based on the one or more parameters.

Clause 44. The wireless device of clause 43, wherein the one or more parameters comprises: a distance threshold indicating a range within which fusing the result of the positioning estimation procedure of the wireless device and the result of the sidelink positioning operation with the RSU is recommended; one or more allowed zone identifiers indicating one or more allowed zones within which fusing the result of the positioning estimation procedure of the wireless device and the result of the sidelink positioning operation with the RSU is recommended; one or more blocked zone identifiers indicating one or more blocked zones within which fusing the result of the positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of the positioning estimation procedure of the wireless device and the result of the sidelink positioning operation with the RSU is recommended; an auxiliary accuracy indicator indicating an expected accuracy level of the positioning estimation procedure in a vicinity of the RSU; or any combination thereof.

Clause 45. The wireless device of any of clauses 43 to 44, further comprising, based on the one or more parameters: means for performing the sidelink positioning operation with the RSU; means for using the RSU as an anchor device for the positioning estimation procedure of the wireless device; means for adjusting an estimated position of the wireless device based on the result of the sidelink positioning operation with the RSU; means for determining an expected accuracy level of the positioning estimation procedure of the wireless device; or any combination thereof.

Clause 46. The wireless device of any of clauses 43 to 45, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 47. The wireless device of any of clauses 43 to 46, wherein the means for receiving the one or more parameters comprises: means for receiving the one or more parameters transmitted by the RSU in a broadcast manner; means for receiving the one or more parameters transmitted by the RSU during exchange of information for establishing a sidelink positioning session; means for receiving the one or more parameters transmitted by the RSU during exchange of measurements for the sidelink positioning session; or any combination thereof.

Clause 48. The wireless device of any of clauses 43 to 47, further comprising: means for sending, to the RSU, a request for the one or more parameters, wherein the means for receiving the one or more parameters comprises means for receiving the one or more parameters transmitted by the RSU in response to the request.

Clause 49. The wireless device of clause 43, wherein: the one or more parameters comprise a distance threshold, and the means for determining whether or how to use the result of the sidelink positioning operation comprises: means for determining a distance between the wireless device and the RSU; and means for fusing the result of the positioning estimation procedure of the wireless device and the result of the sidelink positioning operation with the RSU based on the distance threshold being greater than the distance.

Clause 50. The wireless device of clause 49, wherein the means for determining the distance between the wireless device and the RSU comprises: means for obtaining first location information of the wireless device; means for obtaining second location information of the RSU via the sidelink communication; and means for determining the distance based on the first location information and the second location information.

Clause 51. The wireless device of clause 49, wherein the means for determining the distance between the wireless device and the RSU comprises: means for determining the distance based on performing the sidelink positioning operation with the RSU.

Clause 52. The wireless device of clause 43, wherein: the one or more parameters comprise an allowed zone identifier or a blocked zone identifier, and the means for determining whether or how to use the result of the sidelink positioning operation comprises: means for determining a device zone identifier of the wireless device; and means for fusing the result of the positioning estimation procedure of the wireless device and the result of the sidelink positioning operation with the RSU based on the device zone identifier matching the allowed zone identifier or the device zone identifier not matching the blocked zone identifier.

Clause 53. The wireless device of clause 52, wherein the means for determining the device zone identifier of the wireless device comprises: means for obtaining first location information of the wireless device; and means for mapping the first location information to the device zone identifier based on a mapping relationship.

Clause 54. The wireless device of clause 43, wherein: the one or more parameters comprise an accuracy indicator indicating an expected accuracy level of the sidelink positioning operation with the RSU, and the means for determining whether or how to use the result of the sidelink positioning operation comprises: means for fusing the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

Clause 55. The wireless device of clause 54, wherein the accuracy indicator comprises: an expected ranging error of the sidelink positioning operation with the RSU; one or more standard deviations of the expected ranging error of the sidelink positioning operation with the RSU in association with one or more respective positioning reference signal bandwidths; one or more confidence levels or one or more confidence intervals of the expected ranging error of the sidelink positioning operation with the RSU in association with the one or more respective positioning reference signal bandwidths; or any combination thereof.

Clause 56. The wireless device of clause 43, wherein: the one or more parameters comprise a direction indicator indicating a positioning direction, and the means for determining whether or how to use the result of the sidelink positioning operation comprises: means for fusing a directional component of the result of the positioning estimation procedure of the wireless device and a directional component of the result of the sidelink positioning operation with the RSU along the positioning direction indicated by the direction indicator.

Clause 57. The wireless device of clause 56, wherein the positioning direction indicated by the direction indicator comprises a latitude direction or a longitude direction.

Clause 58. The wireless device of clause 43, wherein: the one or more parameters comprise an auxiliary accuracy indicator indicating an expected accuracy level of the positioning estimation procedure in a vicinity of the RSU, and the means for determining whether or how to use the result of the sidelink positioning operation comprises: means for fusing the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the RSU.

Clause 59. A roadside unit (RSU), comprising: means for obtaining one or more parameters indicating one or more characteristics regarding a sidelink positioning operation with the RSU or regarding a surrounding environment of the RSU; and means for transmitting the one or more parameters to a wireless device via sidelink communication between the RSU and the wireless device.

Clause 60. The RSU of clause 59, wherein the one or more parameters comprises: a distance threshold indicating a range within which fusing a result of a positioning estimation procedure of the wireless device and a result of the sidelink positioning operation with the RSU is recommended; one or more allowed zone identifiers indicating one or more allowed zones within which fusing the result of a positioning estimation procedure of the wireless device and the result of the sidelink positioning operation with the RSU is recommended; one or more blocked zone identifiers indicating one or more blocked zones within which fusing the result of a positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of a positioning estimation procedure of the wireless device and the result of the sidelink positioning operation with the RSU is not recommended; an auxiliary accuracy indicator indicating an expected accuracy level of the positioning estimation procedure in a vicinity of the RSU; or any combination thereof.

Clause 61. The RSU of any of clauses 59 to 60, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 62. The RSU of any of clauses 59 to 61, wherein the means for obtaining the one or more parameters is based on: one or more pre-configured parameter values stored in the RSU; one or more received parameter values from a server; one or more measurements performed by the RSU; or any combination thereof.

Clause 63. The RSU of any of clauses 59 to 62, further comprising: means for receiving, from the wireless device, a request for the one or more parameters, wherein the means for transmitting the one or more parameters is configured to transmit the one or more parameters in response to the request.

Clause 64. A non-transitory computer-readable medium storing computer-executable instructions that, when executed by a wireless device, cause the wireless device to: receive one or more parameters from a roadside unit (RSU) via sidelink communication between the wireless device and the RSU, the one or more parameters indicating one or more characteristics regarding a sidelink positioning operation with the RSU or regarding a surrounding environment of the RSU; and determine whether or how to use a result of the sidelink positioning operation with the RSU with a result of a positioning estimation procedure of the wireless device based on the one or more parameters.

Clause 65. The non-transitory computer-readable medium of clause 64, wherein the one or more parameters comprises: a distance threshold indicating a range within which fusing the result of the positioning estimation procedure of the wireless device and the result of the sidelink positioning operation with the RSU is recommended; one or more allowed zone identifiers indicating one or more allowed zones within which fusing the result of the positioning estimation procedure of the wireless device and the result of the sidelink positioning operation with the RSU is recommended; one or more blocked zone identifiers indicating one or more blocked zones within which fusing the result of the positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of the positioning estimation procedure of the wireless device and the result of the sidelink positioning operation with the RSU is recommended; an auxiliary accuracy indicator indicating an expected accuracy level of the positioning estimation procedure in a vicinity of the RSU; or any combination thereof.

Clause 66. The non-transitory computer-readable medium of any of clauses 64 to 65, further comprising computer-executable instructions that, when executed by the wireless device, cause the wireless device to, based on the one or more parameters: perform the sidelink positioning operation with the RSU; use the RSU as an anchor device for the positioning estimation procedure of the wireless device; adjust an estimated position of the wireless device based on the result of the sidelink positioning operation with the RSU; determine an expected accuracy level of the positioning estimation procedure of the wireless device; or any combination thereof.

Clause 67. The non-transitory computer-readable medium of any of clauses 64 to 66, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 68. The non-transitory computer-readable medium of any of clauses 64 to 67, wherein instructions that cause the wireless device to receive the one or more parameters comprises instructions that cause the wireless device to: receive the one or more parameters transmitted by the RSU in a broadcast manner; receive the one or more parameters transmitted by the RSU during exchange of information for establishing a sidelink positioning session; receive the one or more parameters transmitted by the RSU during exchange of measurements for the sidelink positioning session; or any combination thereof.

Clause 69. The non-transitory computer-readable medium of any of clauses 64 to 68, further comprising computer-executable instructions that, when executed by the wireless device, cause the wireless device to: send, to the RSU, a request for the one or more parameters, wherein instructions that cause the wireless device to receive the one or more parameters comprises instructions that cause the wireless device to receive the one or more parameters transmitted by the RSU in response to the request.

Clause 70. The non-transitory computer-readable medium of clause 64, wherein: the one or more parameters comprise a distance threshold, and the instructions that cause the wireless device to determine whether or how to use the result of the sidelink positioning operation further comprises instructions that cause the wireless device to: determine a distance between the wireless device and the RSU; and fuse the result of the positioning estimation procedure of the wireless device and the result of the sidelink positioning operation with the RSU based on the distance threshold being greater than the distance.

Clause 71. The non-transitory computer-readable medium of clause 70, wherein the instructions that cause the wireless device to determine the distance between the wireless device and the RSU comprises instructions that cause the wireless device to: obtain first location information of the wireless device; obtain second location information of the RSU via the sidelink communication; and determine the distance based on the first location information and the second location information.

Clause 72. The non-transitory computer-readable medium of clause 70, wherein the instructions that cause the wireless device to determine the distance between the wireless device and the RSU comprises instructions that cause the wireless device to: determine the distance based on performing the sidelink positioning operation with the RSU.

Clause 73. The non-transitory computer-readable medium of clause 64, wherein: the one or more parameters comprise an allowed zone identifier or a blocked zone identifier, and the instructions that cause the wireless device to determine whether or how to use the result of the sidelink positioning operation further comprises instructions that cause the wireless device to: determine a device zone identifier of the wireless device; and fuse the result of the positioning estimation procedure of the wireless device and the result of the sidelink positioning operation with the RSU based on the device zone identifier matching the allowed zone identifier or the device zone identifier not matching the blocked zone identifier.

Clause 74. The non-transitory computer-readable medium of clause 73, wherein the instructions that cause the wireless device to determine the device zone identifier of the wireless device comprises instructions that cause the wireless device to: obtain first location information of the wireless device; and map the first location information to the device zone identifier based on a mapping relationship.

Clause 75. The non-transitory computer-readable medium of clause 64, wherein: the one or more parameters comprise an accuracy indicator indicating an expected accuracy level of the sidelink positioning operation with the RSU, and the instructions that cause the wireless device to determine whether or how to use the result of the sidelink positioning operation further comprises instructions that cause the wireless device to: fuse the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

Clause 76. The non-transitory computer-readable medium of clause 75, wherein the accuracy indicator comprises: an expected ranging error of the sidelink positioning operation with the RSU; one or more standard deviations of the expected ranging error of the sidelink positioning operation with the RSU in association with one or more respective positioning reference signal bandwidths; one or more confidence levels or one or more confidence intervals of the expected ranging error of the sidelink positioning operation with the RSU in association with the one or more respective positioning reference signal bandwidths; or any combination thereof.

Clause 77. The non-transitory computer-readable medium of clause 64, wherein: the one or more parameters comprise a direction indicator indicating a positioning direction, and the instructions that cause the wireless device to determine whether or how to use the result of the sidelink positioning operation further comprises instructions that cause the wireless device to: fuse a directional component of the result of the positioning estimation procedure of the wireless device and a directional component of the result of the sidelink positioning operation with the RSU along the positioning direction indicated by the direction indicator.

Clause 78. The non-transitory computer-readable medium of clause 77, wherein the positioning direction indicated by the direction indicator comprises a latitude direction or a longitude direction.

Clause 79. The non-transitory computer-readable medium of clause 64, wherein: the one or more parameters comprise an auxiliary accuracy indicator indicating an expected accuracy level of the positioning estimation procedure in a vicinity of the RSU, and the instructions that cause the wireless device to determine whether or how to use the result of the sidelink positioning operation further comprises instructions that cause the wireless device to: fuse the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the RSU.

Clause 80. A non-transitory computer-readable medium storing computer-executable instructions that, when executed by a roadside unit (RSU), cause the RSU to: obtain one or more parameters indicating one or more characteristics regarding a sidelink positioning operation with the RSU or regarding a surrounding environment of the RSU; and transmit the one or more parameters to a wireless device via sidelink communication between the RSU and the wireless device.

Clause 81. The non-transitory computer-readable medium of clause 80, wherein the one or more parameters comprises: a distance threshold indicating a range within which fusing a result of a positioning estimation procedure of the wireless device and a result of the sidelink positioning operation with the RSU is recommended; one or more allowed zone identifiers indicating one or more allowed zones within which fusing the result of a positioning estimation procedure of the wireless device and the result of the sidelink positioning operation with the RSU is recommended; one or more blocked zone identifiers indicating one or more blocked zones within which fusing the result of a positioning estimation procedure of the wireless device and the result of the sidelink positioning operation with the RSU is not recommended; an accuracy indicator indicating an expected accuracy level of the sidelink positioning operation with the RSU; a direction indicator indicating a positioning direction along which fusing the result of a positioning estimation procedure of the wireless device and the result of the sidelink positioning operation with the RSU is not recommended; an auxiliary accuracy indicator indicating an expected accuracy level of the positioning estimation procedure in a vicinity of the RSU; or any combination thereof.

Clause 82. The non-transitory computer-readable medium of any of clauses 80 to 81, wherein the one or more parameters are provided via: vehicle-to-everything (V2X) application layer signaling; upper layer signaling including system architecture (SA) signaling; lower layer signaling or radio access network (RAN) level signaling including Radio Resource Control (RRC), Medium Access Control Control Element (MAC CE), or physical layer (PHY); or any combination thereof.

Clause 83. The non-transitory computer-readable medium of any of clauses 80 to 82, wherein the instructions cause the wireless device to obtain the one or more parameters based on: one or more pre-configured parameter values stored in the RSU; one or more received parameter values from a server; one or more measurements performed by the RSU; or any combination thereof.

Clause 84. The non-transitory computer-readable medium of any of clauses 80 to 83, further comprising computer-executable instructions that, when executed by the RSU, cause the RSU to: receive, from the wireless device, a request for the one or more parameters, wherein the instructions cause the RSU to transmit the one or more parameters in response to the request.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a wireless device, comprising:
   receiving one or more parameters from a roadside unit (RSU) via sidelink communication between the wireless device and the RSU, the one or more parameters indicating one or more characteristics regarding a sidelink positioning operation with the RSU or regarding a surrounding environment of the RSU, wherein the one or more parameters comprise one or more blocked zone identifiers indicating one or more blocked zones within which fusing the result of the positioning estimation procedure of the wireless device and the result of the sidelink positioning operation with the RSU is not recommended; and
   determining whether or how to use a result of the sidelink positioning operation with the RSU with a result of a positioning estimation procedure of the wireless device based on the one or more parameters.

2. The method of claim 1, wherein the one or more parameters further comprise:
   a distance threshold indicating a range within which fusing the result of the positioning estimation procedure of the wireless device and the result of the sidelink positioning operation with the RSU is recommended;
   one or more allowed zone identifiers indicating one or more allowed zones within which fusing the result of the positioning estimation procedure of the wireless device and the result of the sidelink positioning operation with the RSU is recommended;
   an accuracy indicator indicating an expected accuracy level of the sidelink positioning operation with the RSU;
   a direction indicator indicating a positioning direction along which fusing the result of the positioning estimation procedure of the wireless device and the result of the sidelink positioning operation with the RSU is recommended;
   an auxiliary accuracy indicator indicating an expected accuracy level of the positioning estimation procedure in a vicinity of the RSU; or
   any combination thereof.

3. The method of claim 1, further comprising, based on the one or more parameters:
   performing the sidelink positioning operation with the RSU;
   using the RSU as an anchor device for the positioning estimation procedure of the wireless device;
   adjusting an estimated position of the wireless device based on the result of the sidelink positioning operation with the RSU;
   determining an expected accuracy level of the positioning estimation procedure of the wireless device; or any combination thereof.

4. The method of claim 1, wherein the one or more parameters are provided via:
   vehicle-to-everything (V2X) application layer signaling;
   upper layer signaling including system architecture (SA) signaling;
   lower layer signaling or radio access network (RAN) level signaling including Radio Resource Control (RRC), Medium Access Control Control Element (MAC CE), or physical layer (PHY); or
   any combination thereof.

5. The method of claim 1, wherein the receiving the one or more parameters comprises:
   receiving the one or more parameters transmitted by the RSU in a broadcast manner;
   receiving the one or more parameters transmitted by the RSU during exchange of information for establishing a sidelink positioning session;
   receiving the one or more parameters transmitted by the RSU during exchange of measurements for the sidelink positioning session; or
   any combination thereof.

6. The method of claim 1, further comprising:
   sending, to the RSU, a request for the one or more parameters,
   wherein the receiving the one or more parameters comprises receiving the one or more parameters transmitted by the RSU in response to the request.

7. The method of claim 1, wherein:
   the one or more parameters comprise a distance threshold, and
   the determining whether or how to use the result of the sidelink positioning operation comprises:
      determining a distance between the wireless device and the RSU; and
      fusing the result of the positioning estimation procedure of the wireless device and the result of the sidelink positioning operation with the RSU based on the distance threshold being greater than the distance.

8. The method of claim 7, wherein the determining the distance between the wireless device and the RSU comprises:
   obtaining first location information of the wireless device;
   obtaining second location information of the RSU via the sidelink communication; and
   determining the distance based on the first location information and the second location information.

9. The method of claim 7, wherein the determining the distance between the wireless device and the RSU comprises:
   determining the distance based on performing the sidelink positioning operation with the RSU.

10. The method of claim 1, wherein:
the one or more parameters comprise an allowed zone identifier or a blocked zone identifier, and
the determining whether or how to use the result of the sidelink positioning operation comprises:
determining a device zone identifier of the wireless device; and
fusing the result of the positioning estimation procedure of the wireless device and the result of the sidelink positioning operation with the RSU based on the device zone identifier matching the allowed zone identifier or the device zone identifier not matching the blocked zone identifier.

11. The method of claim 10, wherein the determining the device zone identifier of the wireless device comprises:
obtaining first location information of the wireless device; and
mapping the first location information to the device zone identifier based on a mapping relationship.

12. The method of claim 1, wherein:
the one or more parameters comprise an accuracy indicator indicating an expected accuracy level of the sidelink positioning operation with the RSU, and
the determining whether or how to use the result of the sidelink positioning operation comprises:
fusing the result of the positioning estimation procedure of the wireless device and the result of the sidelink positioning operation with the RSU based on the expected accuracy level of the sidelink positioning operation with the RSU being greater than an expected accuracy level of the positioning estimation procedure of the wireless device.

13. The method of claim 12, wherein the accuracy indicator comprises:
an expected ranging error of the sidelink positioning operation with the RSU;
one or more standard deviations of the expected ranging error of the sidelink positioning operation with the RSU in association with one or more respective positioning reference signal bandwidths;
one or more confidence levels or one or more confidence intervals of the expected ranging error of the sidelink positioning operation with the RSU in association with the one or more respective positioning reference signal bandwidths; or
any combination thereof.

14. The method of claim 1, wherein:
the one or more parameters comprise a direction indicator indicating a positioning direction, and
the determining whether or how to use the result of the sidelink positioning operation comprises:
fusing a directional component of the result of the positioning estimation procedure of the wireless device and a directional component of the result of the sidelink positioning operation with the RSU along the positioning direction indicated by the direction indicator.

15. The method of claim 14, wherein the positioning direction indicated by the direction indicator comprises a latitude direction or a longitude direction.

16. The method of claim 1, wherein:
the one or more parameters comprise an auxiliary accuracy indicator indicating an expected accuracy level of the positioning estimation procedure in a vicinity of the RSU, and
the determining whether or how to use the result of the sidelink positioning operation comprises:
fusing the result of the positioning estimation procedure of the wireless device and the result of the sidelink positioning operation with the RSU based on an expected accuracy level of the sidelink positioning operation with the RSU being greater than the expected accuracy level of the positioning estimation procedure in the vicinity of the RSU.

17. A method of operating a roadside unit (RSU), comprising:
obtaining one or more parameters indicating one or more characteristics regarding a sidelink positioning operation with the RSU or regarding a surrounding environment of the RSU, wherein the one or more parameters comprise one or more blocked zone identifiers indicating one or more blocked zones within which fusing the result of the positioning estimation procedure of the wireless device and the result of the sidelink positioning operation with the RSU is not recommended; and
transmitting the one or more parameters to a wireless device via sidelink communication between the RSU and the wireless device.

18. The method of claim 17, wherein the one or more parameters further comprise:
a distance threshold indicating a range within which fusing a result of a positioning estimation procedure of the wireless device and a result of the sidelink positioning operation with the RSU is recommended;
one or more allowed zone identifiers indicating one or more allowed zones within which fusing the result of a positioning estimation procedure of the wireless device and the result of the sidelink positioning operation with the RSU is recommended;
an accuracy indicator indicating an expected accuracy level of the sidelink positioning operation with the RSU;
a direction indicator indicating a positioning direction along which fusing the result of a positioning estimation procedure of the wireless device and the result of the sidelink positioning operation with the RSU is not recommended;
an auxiliary accuracy indicator indicating an expected accuracy level of the positioning estimation procedure in a vicinity of the RSU; or
any combination thereof.

19. The method of claim 17, wherein the one or more parameters are provided via:
vehicle-to-everything (V2X) application layer signaling;
upper layer signaling including system architecture (SA) signaling;
lower layer signaling or radio access network (RAN) level signaling including Radio Resource Control (RRC), Medium Access Control Control Element (MAC CE), or physical layer (PHY); or
any combination thereof.

20. The method of claim 17, wherein the obtaining the one or more parameters is based on:
one or more pre-configured parameter values stored in the RSU;
one or more received parameter values from a server;
one or more measurements performed by the RSU; or any combination thereof.

21. The method of claim 17, further comprising:
receiving, from the wireless device, a request for the one or more parameters,
wherein the transmitting the one or more parameters is performed in response to the request.

22. A wireless device, comprising:

a memory;

at least one transceiver; and at least one processor communicatively coupled to the memory and the at least one transceiver, the at least one processor configured to:

receive, via the at least one transceiver, one or more parameters from a roadside unit (RSU) via sidelink communication between the wireless device and the RSU, the one or more parameters indicating one or more characteristics regarding a sidelink positioning operation with the RSU or regarding a surrounding environment of the RSU, wherein the one or more parameters comprise one or more blocked zone identifiers indicating one or more blocked zones within which fusing the result of the positioning estimation procedure of the wireless device and the result of the sidelink positioning operation with the RSU is not recommended; and determine whether or how to use a result of the sidelink positioning operation with the RSU with a result of a positioning estimation procedure of the wireless device based on the one or more parameters.

23. The wireless device of claim 22, wherein the one or more parameters further comprise:

a distance threshold indicating a range within which fusing the result of the positioning estimation procedure of the wireless device and the result of the sidelink positioning operation with the RSU is recommended;

one or more allowed zone identifiers indicating one or more allowed zones within which fusing the result of the positioning estimation procedure of the wireless device and the result of the sidelink positioning operation with the RSU is recommended;

an accuracy indicator indicating an expected accuracy level of the sidelink positioning operation with the RSU;

a direction indicator indicating a positioning direction along which fusing the result of the positioning estimation procedure of the wireless device and the result of the sidelink positioning operation with the RSU is recommended;

an auxiliary accuracy indicator indicating an expected accuracy level of the positioning estimation procedure in a vicinity of the RSU; or any combination thereof.

24. The wireless device of claim 22, wherein the at least one processor is further configured to, based on the one or more parameters:

perform the sidelink positioning operation with the RSU;

use the RSU as an anchor device for the positioning estimation procedure of the wireless device;

adjust an estimated position of the wireless device based on the result of the sidelink positioning operation with the RSU;

determine an expected accuracy level of the positioning estimation procedure of the wireless device; or any combination thereof.

25. The wireless device of claim 22, wherein the one or more parameters are provided via:

vehicle-to-everything (V2X) application layer signaling;

upper layer signaling including system architecture (SA) signaling;

lower layer signaling or radio access network (RAN) level signaling including Radio Resource Control (RRC), Medium Access Control Control Element (MAC CE), or physical layer (PHY); or any combination thereof.

26. The wireless device of claim 22, wherein the at least one processor is configured to receive the one or more parameters comprises the at least one processor is further configured to:

receive, via the at least one transceiver, the one or more parameters transmitted by the RSU in a broadcast manner;

receive, via the at least one transceiver, the one or more parameters transmitted by the RSU during exchange of information for establishing a sidelink positioning session;

receive, via the at least one transceiver, the one or more parameters transmitted by the RSU during exchange of measurements for the sidelink positioning session; or any combination thereof.

27. A roadside unit (RSU), comprising:

a memory;

at least one transceiver; and at least one processor communicatively coupled to the memory and the at least one transceiver, the at least one processor configured to:

obtain one or more parameters indicating one or more characteristics regarding a sidelink positioning operation with the RSU or regarding a surrounding environment of the RSU, wherein the one or more parameters comprise one or more blocked zone identifiers indicating one or more blocked zones within which fusing the result of the positioning estimation procedure of the wireless device and the result of the sidelink positioning operation with the RSU is not recommended; and transmit, via the at least one transceiver, the one or more parameters to a wireless device via sidelink communication between the RSU and the wireless device.

28. The RSU of claim 27, wherein the one or more parameters further comprise:

a distance threshold indicating a range within which fusing a result of a positioning estimation procedure of the wireless device and a result of the sidelink positioning operation with the RSU is recommended;

one or more allowed zone identifiers indicating one or more allowed zones within which fusing the result of a positioning estimation procedure of the wireless device and the result of the sidelink positioning operation with the RSU is recommended;

an accuracy indicator indicating an expected accuracy level of the sidelink positioning operation with the RSU;

a direction indicator indicating a positioning direction along which fusing the result of a positioning estimation procedure of the wireless device and the result of the sidelink positioning operation with the RSU is not recommended;

an auxiliary accuracy indicator indicating an expected accuracy level of the positioning estimation procedure in a vicinity of the RSU; or any combination thereof.

29. The RSU of claim 27, wherein the one or more parameters are provided via:

vehicle-to-everything (V2X) application layer signaling;

upper layer signaling including system architecture (SA) signaling;

lower layer signaling or radio access network (RAN) level signaling including Radio Resource Control (RRC), Medium Access Control Control Element (MAC CE), or physical layer (PHY); or any combination thereof.

30. The RSU of claim 27, wherein the at least one processor is configured to obtain the one or more parameters based on:

one or more pre-configured parameter values stored in the RSU;

one or more received parameter values from a server;

one or more measurements performed by the RSU; or any combination thereof.

\* \* \* \* \*